(12) United States Patent
Suzuki

(10) Patent No.: US 11,724,615 B2
(45) Date of Patent: Aug. 15, 2023

(54) BATTERY MANAGEMENT SYSTEM

(71) Applicant: RESC, LTD., Tokyo (JP)

(72) Inventor: Daisuke Suzuki, Tokyo (JP)

(73) Assignee: RESC, LTD., Tokyo (JP)

( * ) Notice: Subject to any disclaimer, the term of this patent is extended or adjusted under 35 U.S.C. 154(b) by 164 days.

(21) Appl. No.: 17/020,830

(22) Filed: Sep. 15, 2020

(65) Prior Publication Data

US 2021/0001744 A1 Jan. 7, 2021

Related U.S. Application Data

(63) Continuation of application No. PCT/JP2019/025487, filed on Jun. 26, 2019.

(30) Foreign Application Priority Data

Jun. 29, 2018 (JP) ................................. 2018-124979

(51) Int. Cl.
*B60L 53/62* (2019.01)
*B60L 50/50* (2019.01)
(Continued)

(52) U.S. Cl.
CPC ............... *B60L 53/62* (2019.02); *B60L 50/50* (2019.02); *B60L 53/66* (2019.02); *B60L 53/68* (2019.02); *B60L 53/80* (2019.02); *B60L 58/16* (2019.02)

(58) Field of Classification Search
None
See application file for complete search history.

(56) References Cited

U.S. PATENT DOCUMENTS

2010/0094496 A1* 4/2010 Hershkovitz ........... B60L 53/14
701/22
2010/0274656 A1* 10/2010 Genschel ................ B60L 53/80
705/14.27

(Continued)

FOREIGN PATENT DOCUMENTS

GB 2460500 A * 12/2009 .......... B60L 11/1818
JP 2015-015827 A 1/2005

(Continued)

OTHER PUBLICATIONS

JP-2015015827-A Machine Translation (Year: 2022).*

(Continued)

*Primary Examiner* — David V Henze-Gongola
(74) *Attorney, Agent, or Firm* — Yokoi & Co., U.S.A.; Toshiyuki Yokoi

(57) ABSTRACT

Provided is a battery management system of an electric vehicle suitable for a sharing service. A battery management system 100 includes: an electric vehicle 2 capable of travelling by driving a motor with an exchangeable battery 1; a battery station 3 capable of charging the battery 1 by adjusting a charging speed; and a management server 4 connected to the electric vehicle 2 and the battery station 3 through a communication network. The management server 4 quantitatively evaluates exchangeability of the battery 1 stored in the battery station 3, on the basis of at least a position of the electric vehicle 2 and a battery remaining amount of the battery 1 mounted on the electric vehicle 2, determines the charging speed of the battery 1 of the battery station 3, on the basis of an evaluation value of the exchangeability of the battery 1, and transmits control information relevant to the determined charging speed, to the battery station 3.

15 Claims, 10 Drawing Sheets

(51) Int. Cl.
  *B60L 53/68* (2019.01)
  *B60L 53/66* (2019.01)
  *B60L 58/16* (2019.01)
  *B60L 53/80* (2019.01)

(56) References Cited

U.S. PATENT DOCUMENTS

| | | |
|---|---|---|
| 2011/0156662 A1 | 6/2011 | Nakamura et al. |
| 2014/0361745 A1 | 12/2014 | Nishita et al. |
| 2015/0268308 A1 | 9/2015 | Nakayama et al. |
| 2015/0354974 A1 | 12/2015 | Takehara et al. |
| 2018/0260887 A1 | 9/2018 | Takatsuka et al. |
| 2019/0202416 A1* | 7/2019 | Lai ..................... B60L 53/305 |

FOREIGN PATENT DOCUMENTS

| | | | | |
|---|---|---|---|---|
| JP | 2015015827 A | * | 1/2015 | ............. B60L 53/11 |
| JP | 5680222 B | | 3/2015 | |
| JP | 5868454 B | | 2/2016 | |
| JP | 5939269 B | | 6/2016 | |
| JP | 2017-091427 A | | 5/2017 | |
| KR | 2018-0005048 A | | 1/2018 | |
| WO | 2015/001930 A | | 1/2015 | |

OTHER PUBLICATIONS

International Search Report for PCT/JP2019/025487 dated Sep. 10, 2019.
PCT written opinion dated Sep. 10, 2019.
Corrected English translation of PCT written opinion dated Sep. 10, 2019.
Extended European Search Report dated Feb. 25, 2022.

* cited by examiner

Fig. 4

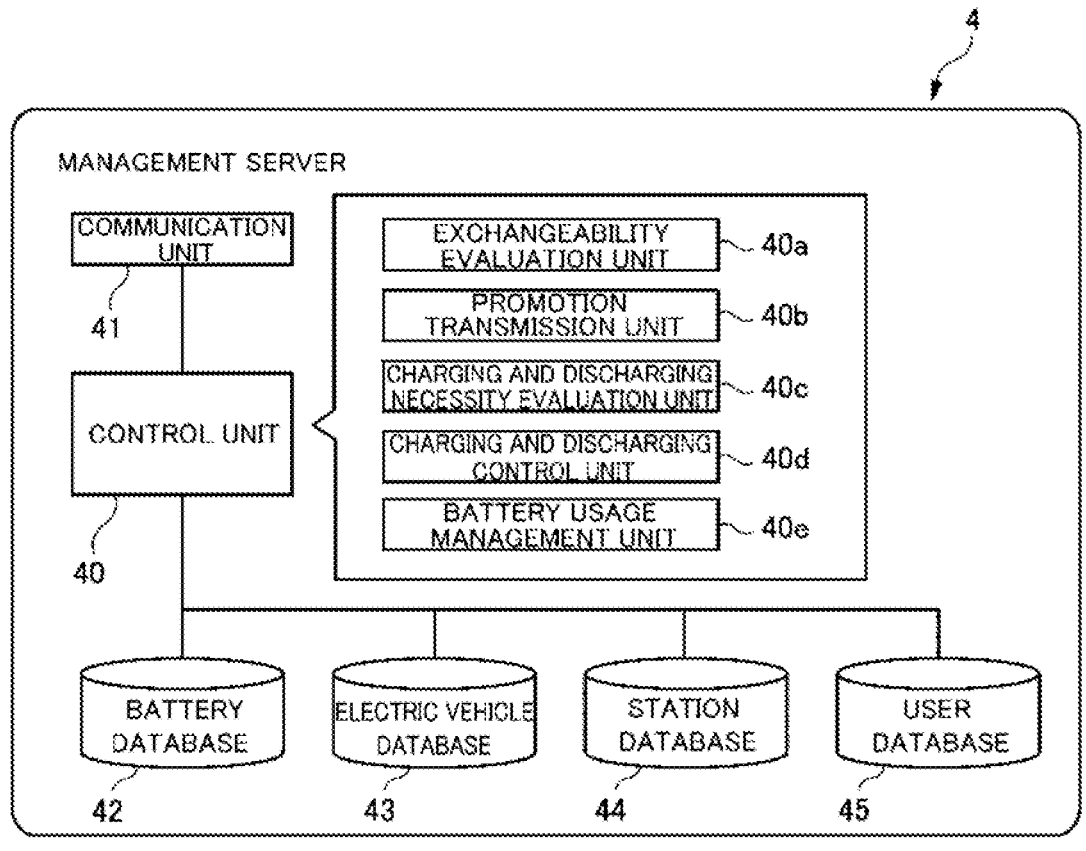

BATTERY DATABASE

| IDENTIFICATION NUMBER | CURRENT LOCATION | NUMBER OF TIMES OF CHARGING | | | BATTERY REMAINING AMOUNT | FULL CHARGE CAPACITY | DEGREE OF DETERIORATION |
|---|---|---|---|---|---|---|---|
| | | HIGH-SPEED | NORMAL | LOW-SPEED | | | |
| B1501 | V5462-2 | 30 | 50 | 20 | 30Wh | 85Ah(100Wh) | B |
| B1502 | S4687-1 | 200 | 250 | 100 | 40Wh | 85Ah(120Wh) | C |
| B1503 | V6541-3 | 15 | 20 | 10 | 70Wh | 95Ah(100Wh) | A |
| B1504 | 35.681167, ... | 300 | 200 | 100 | 90Wh | 90Ah(150Wh) | D |

DEGREE OF DETERIORATION
- A ⋯ FOR LARGE-SIZE ELECTRIC VEHICLE (SUCH AS ELECTRIC AUTOMOBILE)
- B ⋯ FOR SMALL-SIZE ELECTRIC VEHICLE (SUCH AS ELECTRIC SCOOTER OR ELECTRIC BICYCLE)
- C ⋯ FOR PORTABLE POWER SOURCE (SUCH AS AN ELECTRIC TOOL OR EXTERIOR ILLUMINATION EQUIPMENT)
- D ⋯ FOR STATIONARY STORAGE BATTERY (SUCH AS HOUSEHOLD STORAGE BATTERY OR STORAGE BATTERY FOR POWER SYSTEM)
- E ⋯ DISCARD

Fig. 8

| BATTERY | STATION 1 | | | STATION 2 | | | STATION 3 | | | STATION 4 | | | |
|---|---|---|---|---|---|---|---|---|---|---|---|---|---|
| | A | B | C | D | E | F | G | H | I | J | K | L | |
| EVALUATION RESULT OF STEP 1 (EXCHANGEABILITY) | 2 | 2 | 0 | 1 | 1 | 0 | 0 | 0 | 2 | 0 | 2 | 1 | EXCHANGEABILITY: HIGH 2 TO LOW 0 |
| EVALUATION RESULT OF STEP 2 (EXCHANGEABILITY) | 1 | 2 | 0 | 0 | 0 | 0 | 5 | 2 | 1 | 2 | 0 | 0 | EXCHANGEABILITY: HIGH 5 TO LOW 0 |
| EVALUATION RESULT OF STEP 3 (NECESSITY OF CHARGING OR DISCHARGING) | 0 | 1 | 0 | 2 | 0 | 2 | 1 | 2 | 1 | 2 | -5 | -5 | CHARGING NECESSITY: HIGH 2 TO NONE 0. DISCHARGING NECESSITY: HIGH -5 TO NONE 0 |
| TOTAL OF CHARGING PRIORITY/CHARGING SPEED OF STEPS 1 TO 3 | 3 | 5 | 0 | 3 | 1 | 2 | 6 | 4 | 4 | / | / | / | CHARGING PRIORITY: HIGH 9 TO LOW 0. BATTERY OF CHARGING TARGET 2 OR MORE |
| | STATION OF CHARGING TARGET | | | STATION OF CHARGING TARGET | | | STATION OF CHARGING TARGET | | | STATION OF DISCHARGING TARGET | | | |

BATTERY MANAGEMENT SYSTEM

CROSS-REFERENCE TO RELATED APPLICATIONS

This application claims the benefit of priority and is a Continuation application of the prior International Patent Application No. PCT/JP2019/025487, with an international filing date of Jun. 26, 2019, which designated the United States, and is related to the Japanese Patent Application No. 2018-124979, filed Jun. 29, 2018, the entire disclosures of all applications are expressly incorporated by reference in their entirety herein.

TECHNICAL FIELD

The present invention relates to a management system of a battery which is a driving source of an electric vehicle or the like. Specifically, the present invention relates to a battery management system including an electric vehicle using an exchangeable battery as a driving source, a battery station for charging the battery, and a management server for controlling charging and discharging of the battery. In addition, the present invention relates to the management server described above, a program for a management server, a battery management method, and the like.

BACKGROUND ART

From the related art, an electric vehicle mounted with an exchangeable battery has been known. The electric vehicle travels by driving a motor with power supplied from the battery through a power control device. An electric automobile, an electric scooter, an electric bicycle, and the like can be exemplified as a representative of such an electric vehicle.

In the present state, a distance that the electric vehicle as described above is capable of travelling by single charging or battery exchange, is shorter than a general liquid fuel automobile (a gas-powered car, a diesel-powered car, a liquid natural gas-powered car, and the like), from the problem of the performance or the cost of the battery. For this reason, in the present state, an infrastructure construction of increasing the number of battery stations for charging the battery, has progressed such that the charging or the exchange of the battery of the electric vehicle can be frequently performed. For this reason, a user of the electric vehicle stops by a near battery station when a battery remaining amount of the battery of the own car becomes low, and exchanges the battery of the own car with a battery charged in the battery station, and thus, is capable of allowing the electric vehicle to continuously travel.

However, even though it depends on a charging current value of the battery, in a general battery station, a charging time of several ten minutes to several hours is required to completely charge a battery for an electric vehicle. For this reason, even though the electric vehicle arrives at the nearest battery station, in a case where the charging of the battery is not completed, it is necessary to wait for the charging to be completed in front of the battery station. Thus, in a system of the related art, a situation that even though the electric vehicle arrives at the battery station, it is not possible to quickly perform the battery exchange is also assumed. This is one of factors of disturbing the spread of a system including the electric vehicle or the battery station.

In order to solve the problem of the electric vehicle or the battery station of the battery exchange system as described above, the applicant has proposed a battery exchange system for an electric vehicle (Patent Literature 1). In the battery exchange system, the battery is charged in advance in the battery station, and thus, when the battery remaining amount of the electric vehicle decreases, the consumed battery of the electric vehicle can be instantaneously exchanged with the charged battery in the station. Accordingly, there is a merit that the user of the electric vehicle is capable of obtaining the charged battery in a short period of time, and it is not necessary to wait for the battery to be charged.

In addition, in the same literature, the applicant has proposed a technology in which when there is a request for battery exchange from the user, a time until the electric vehicle arrives at the battery station, is expected, a charging speed of each of the batteries stored in the battery station, is controlled on the basis of the expected arrival time, and thus, the battery is prevented from wastefully deteriorating, and the degree of deterioration and the battery remaining amount of the battery are suitably controlled.

CITATION LIST

Patent Literature

Patent Literature 1: Pamphlet of International Publication No. WO2015/001930

SUMMARY OF INVENTION

Technical Problem

However, recently, a social mechanism of sharing an object, a service, a place, or the like in the individuals, by using IT, that is, sharing economy has developed, and the electric vehicle has also been a sharing target. In particular, the electric bicycle is suitable for the sharing target from the viewpoint of being casually used by many people as a movement unit for a short distance, and a sharing service of such an electric bicycle has been started to spread domestically and abroad. In addition, in the sharing service of the electric bicycle, a dockless service in which getting in or returning the vehicle can be freely performed by the user regardless of the parking place by monitoring the current position of the vehicle on a web server, has also been proposed, in addition to a service in which getting in and returning the vehicle can be performed only in a predetermined parking place (a dock).

However, in the sharing service of the electric vehicle such as an electric bicycle, a charging operation of the battery mounted on the electric vehicle is problematic. In particular, in the service of a dockless system, it is almost impossible for an operator of the service to charge all of the electric vehicles, and thus, it is necessary for the user to perform the charging operation of the battery. Therefore, as proposed in Patent Literature 1, it is considered that it is effective to provide a battery station for charging an exchangeable battery in each place, and to make a mechanism in which the user is capable of instantaneously exchanging the consumed battery of the electric vehicle with the charged battery in the battery station.

However, in the sharing service of the electric vehicle, it is almost impossible to specify in advance which user gets in which electric vehicle at what time and where, and moves in which direction, and in particular, in the dockless system, it is not obvious to which place the electric vehicle is returned or from which place the user starts to use the electric vehicle. In response to this, in the system proposed in Patent Literature 1, on the premise that a specific user possesses and manages a specific electric vehicle, as described above, when there is the request for battery exchange from the user, the time until the electric vehicle arrives at the battery station is expected, and the charging speed of each of the batteries stored in the battery station is controlled on the basis of the expected arrival time, but it is difficult to apply such a charging control method to the sharing service of the electric vehicle, as it is. That is, in the sharing service, it is difficult to specify which user appears in which electric vehicle at what time and where, and thus, it is difficult to expect the time until the electric vehicle arrives at the battery station, and as a result thereof, in an algorithm described in Patent Literature 1, under the situation of the sharing service, it is not possible to suitably control the charging speed or the like of the battery in the battery station.

Therefore, an object of the present invention is to mainly provide a battery management system of an electric vehicle suitable for a sharing service.

Solution to Problem

A first aspect of the present invention relates to a battery management system. The battery management system according to the present invention includes an electric vehicle, a battery station, and a management server. The electric vehicle travels by driving a motor with an exchangeable battery. Examples of the electric vehicle include an electric automobile (an electric four-wheeled vehicle), an electric three-wheeled vehicle, an electric scooter (an electric two-wheeled vehicle), and an electric bicycle. The electric bicycle includes a full electric bicycle capable of self-travelling by only driving a motor, and an electric bicycle which aids human power with a motor. The battery station has facility capable of charging the battery by adjusting a charging speed. The management server is connected to the electric vehicle and the battery station through a communication network. Furthermore, the battery itself may be connected to the management server through the communication network. In this case, in a case where the electric vehicle itself is directly connected to the management server, a case where the electric vehicle is connected to the management server through the battery mounted on the electric vehicle, or a case where the battery station is connected to the management server through the battery stored in the battery station, is also included in the range of the present invention, in addition to a case where the battery station itself is directly connected to the management server.

In the present invention, it is preferable that the management server quantitatively evaluates exchangeability of the battery stored in the battery station, on the basis of at least a position of the electric vehicle and a battery remaining amount of the battery mounted on the electric vehicle, and determines the charging speed of the battery of the battery station, on the basis of an evaluation value of the exchangeability of the battery. Then, the management server transmits control information relevant to the charging speed determined as described above, to the battery station. The battery station controls the charging speed of the battery stored in the battery station, according to the control information from the management server. Here, evaluating the exchangeability of the battery stored in the battery station, as with the present invention, is different from expecting the time until the electric vehicle arrives at the battery station, as described in Patent Literature 1. For example, in the present invention, in a case where it is assumed that a user gets in the electric vehicle of which the battery remaining amount is high, a battery station near from a position where the user gets in the electric vehicle is evaluated as having low exchangeability of the battery, and a battery station in the vicinity of a marginal distance that the electric vehicle is capable of travelling with the charging remaining amount of the battery, is evaluated as having high exchangeability of the battery. Then, for example, the exchangeability of each of the batteries is quantified, and the charging speed of each of the batteries is determined on the basis of an evaluation value thereof. Accordingly, even in a situation where it is difficult to expect an arrival time with respect to the battery station, it is possible to efficiently charge the battery in each of the stations. Accordingly, according to the present invention, it is possible to realize the battery management mainly suitable for a sharing service of the electric vehicle.

In the battery management system according to the present invention, it is preferable that the electric vehicle is shared by a plurality of users. That is, it is preferable that the system of the present invention is applied to the sharing service of the electric vehicle. In addition, it is preferable that the management server further evaluates the exchangeability of the battery stored in the battery station, on the basis of a usage start position of the electric vehicle of the user and a travelling direction of the user, in addition to the position of the electric vehicle and the battery remaining amount of the battery mounted on the electric vehicle. For example, a battery station existing in the travelling direction of the user who gets in the electric vehicle, is evaluated as having high exchangeability of the battery, on the basis of the usage start position of the electric vehicle of the user, and a battery station existing in a direction opposite to the travelling direction, is evaluated as having low exchangeability of the battery. Accordingly, it is possible to accurately control a charging amount or a charging speed of a battery for an electric vehicle. Furthermore, here the "travelling direction of the user" also includes the travelling direction of the user who does not get in the electric vehicle, in addition to the travelling direction of the user who gets in the electric vehicle. The travelling direction of the user who does not get in the electric vehicle, for example, may be expected on the basis of movement information or the like of a mobile terminal possessed by the user.

The battery management system according to the present invention, further includes a user terminal possessed by the plurality of users sharing the electric vehicle. In addition, it is preferable that the management server is capable of transmitting promotion information of leading to the battery station, to the user terminal. In this case, it is preferable that the management server evaluates the exchangeability of the battery stored in the battery station, on the basis of the promotion information, in addition to the position of the electric vehicle and the battery remaining amount of the battery mounted on the electric vehicle. For example, the promotion information including a coupon or the like which can be used in the vicinity of a certain battery station, is transmitted from the management server to the user terminal, and thus, the user receiving the promotion information visits the vicinity of the battery station, and a possibility that the battery is exchanged in the station, increases. In addition, the exchangeability of the battery also increases and decreases according to the contents of the promotion information (privilege contents). Thus, the promotion information affects the exchangeability of the battery, and thus, it is preferable that the management server expects the exchangeability of each of the batteries, in consideration of the contents of the promotion information. Further, the promotion information can be delivered to an arbitrary user by an operator of this system, and thus, it is also possible to lead the arbitrary user to a battery station convenient for the operator.

In the battery management system according to the present invention, it is preferable that the battery station is further capable of discharging the battery by adjusting a discharging speed. Furthermore, the "discharging" of the battery includes discharging from the battery to a power network or a facility in which the battery station is provided or the vicinity of the facility, so-called electric power selling. Furthermore, the vicinity of the facility, for example, includes other facilities positioned within a radius of 100 m, from the facility. In this case, it is preferable that the management server quantitatively evaluates necessity of charging or discharging the battery stored in the battery station, on the basis of a demand and a supply of power in a power market or in a facility in which the battery station is provided or in the vicinity of the facility, and determines the charging speed or the discharging speed of the battery of the battery station, on the basis of the evaluation value of the exchangeability of the battery and an evaluation value of the necessity of charging or discharging the battery. The management server transmits control information relevant to the determined charging speed or discharging speed, to the battery station. The battery station charges or discharges the battery, on the basis of the control information received from the management server. Furthermore, it is preferable that the "demand and the supply of the power in the power market or in the facility in which the battery station is provided or in the vicinity of the facility", is performed in consideration of an electric rate, $CO_2$ emissions, a carbon tax, a carbon credit, and the like, in addition to a demand and supply request timing of power from a power grid. Thus, the charging speed or the discharging speed of the battery of the battery station is controlled in consideration of a demand and a supply from the power market or the facility in which the battery station is provided or the vicinity of the facility, and thus, for example, the charging and discharging of the power can be suitably controlled such that when the electric rate is inexpensive, the battery is charged, and when the electric rate is expensive, the electric power selling is performed from the battery.

In the battery management system according to the present invention, it is preferable that the electric vehicle includes a plurality of categories of electric vehicles having different usages. For example, the category may be classified into a large-size electric vehicle having large power consumption (an electric automobile or the like) and a small-size electric vehicle having small power consumption (an electric scooter, an electric bicycle, or the like). In this case, it is preferable that the management server determines the category of the electric vehicle on which the battery is mounted, according to a degree of deterioration of the battery. For example, a battery having a low degree of deterioration can be set to be used in the large-size electric vehicle, and a battery having a high degree of deterioration can be set to be used in the small-size electric vehicle. For example, in a case where it is assumed that the system of the present invention is applied to the sharing service in which the same battery can be shared in electric vehicles of different categories, such as an electric automobile and an electric bicycle, it is possible to determine on which electric vehicle the battery is mounted, according to the degree of deterioration of the battery (a usage frequency, the number of usages, or the like). Accordingly, in such a sharing service, it is possible to efficiently use again the battery. In addition, it is possible to use again the battery not only in the electric vehicle, but also in a portable power source or a stationary storage battery.

In the battery management system according to the present invention, the battery may be used even in equipments other than the electric vehicle. The equipments include a plurality of categories of equipments having different usages. Then, the management server determines the category of the equipment of using the battery, according to the degree of deterioration of the battery. The equipment described above, for example, includes electric equipment such as an electric tool, exterior illumination equipment, a household storage battery, or a storage battery for a power system.

A second aspect of the present invention relates to a management server for controlling the entire battery management system described above. The management server according to the present invention is a web server connected to an electric vehicle capable of travelling by driving a motor with an exchangeable battery, and a battery station capable of charging the battery by adjusting a charging speed, through a communication network. It is preferable that the management server quantitatively evaluates exchangeability of the battery stored in the battery station, on the basis of at least a position of the electric vehicle and a battery remaining amount of the battery mounted on the electric vehicle, determines the charging speed of the battery of the battery station, on the basis of an evaluation value of the exchangeability of the battery, and transmits control information relevant to the determined charging speed, to the battery station.

A third aspect of the present invention relates to a computer program for allowing a server device (a web server) to function as the management server according to the second aspect described above. The computer program may be downloaded on the server device through the internet, or may be pre-installed in the server device. In addition, the computer program may be stored in a recording medium such as a CR-ROM.

A fourth aspect of the present invention relates to a battery management method. In the battery management method according to the present invention, a management server quantitatively evaluates exchangeability of an exchangeable battery stored in a battery station, on the basis of a position of an electric vehicle capable of travelling by driving a motor with the battery and a battery remaining amount of the battery mounted on the electric vehicle. In addition, the management server determines a charging speed of the battery of the battery station, on the basis of an evaluation value of the expected exchangeability of the battery. Then, the battery is charged in the battery station, on the basis of the determined charging speed.

Advantageous Effects of Invention

The present invention is capable of mainly providing a battery management system of an electric vehicle suitable for a sharing service.

BRIEF DESCRIPTION OF DRAWINGS

FIG. 4 is a block diagram illustrating a functional configuration of a management server.

FIG. 8 is a score table schematically illustrating an example of the charging control information generation processing.

DESCRIPTION OF EMBODIMENTS

Hereinafter, modes for carrying out the present invention will be described by using the drawings. The present invention is not limited to the following modes, and includes suitable modifications from the following modes, which are performed by a person skilled in the art within an obvious range.

Figure 1:
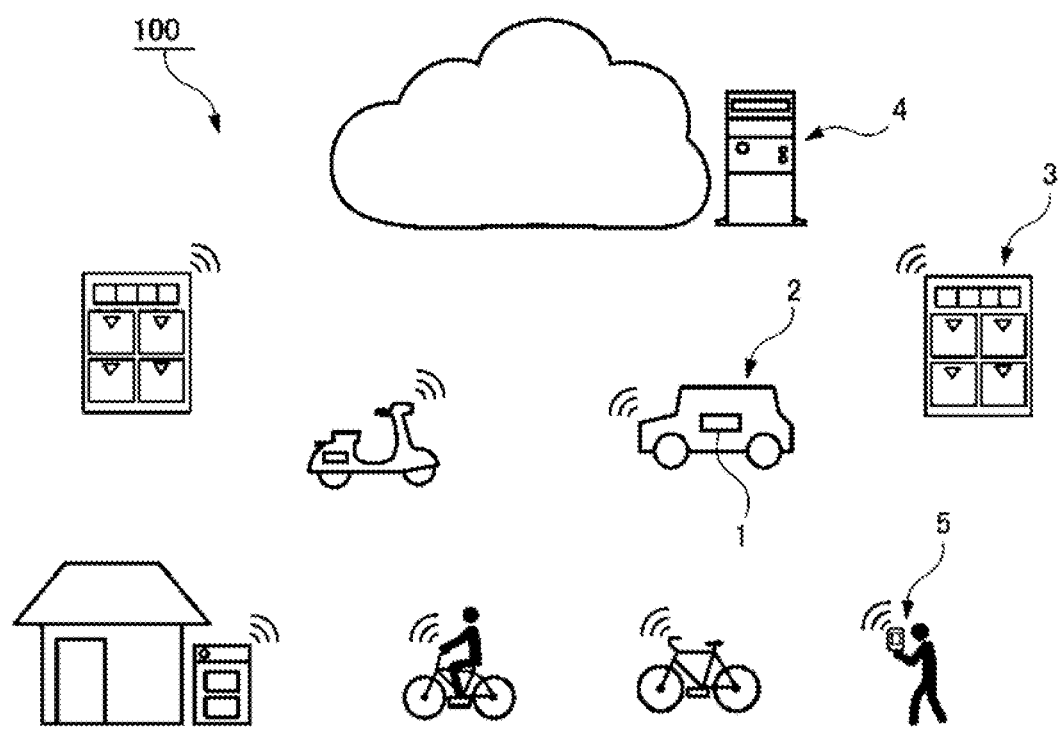
FIG. 1 is an overall view of a battery management system.

FIG. 1 is an overall view illustrating the outline of a battery management system 100. As illustrated in FIG. 1, the battery management system 100 includes a plurality of electric vehicles 2 mounted with an exchangeable battery 1, a plurality of battery stations 3 charging the exchangeable battery 1, a management server 4 managing the entire system, and a user terminal 5 possessed by a user of the electric vehicle 2. The electric vehicle 2, the battery station 3, the management server 4, and the user terminal 5 are capable of transmitting and receiving information with respect to each other, through near field communication such as the internet or Bluetooth (Registered Trademark). For example, the electric vehicle 2, the battery station 3, and the user terminal 5 are respectively connected to the management server 4, through the internet. In addition, the user terminal 5 is capable of performing the near field communication with respect to the electric vehicle 2 or the battery station 3. In addition, the battery 1 itself has a network communication function and a near field communication function, and the battery 1 is capable of directly communicating with the electric vehicle 2, the battery station 3, the management server 4, and the user terminal 5.

The electric vehicle 2 travels by driving a motor, according to power to be supplied from one or a plurality of batteries 1 mounted on the vehicle. An example of the electric vehicle 2 is an electric automobile (an electric four-wheeled vehicle), an electric three-wheeled vehicle, an electric scooter (an electric two-wheeled vehicle), and an electric bicycle. In a case where a battery remaining amount of the battery 1 for driving decreases, the electric vehicle 2 stops by a near battery station 3. In the battery station 3, the plurality of batteries 1 are stored and charged. The user of the electric vehicle 2 takes out the required number of charged batteries 1 from the battery station 3, and switches the charged battery 1 with the consumed battery 1 mounted on the electric vehicle 2. Accordingly, the electric vehicle 2 is capable of continuously travelling by using the charged battery 1. On the other hand, the battery 1 of which the battery remaining amount is low, is mounted on the battery station 3. Accordingly, the battery station 3 receives power supply from a power source such as a power network, and starts to charge the battery 1 mounted thereon.

In addition, in this system, it is preferable that the battery 1 is standardized, and can be used in various types of electric vehicles 2. For example, it is preferable that the same battery 1 can be used as the power source of the electric automobile and the electric scooter. In addition, in the electric automobile and the electric scooter, it is also possible to adjust output according to each vehicle type, by changing the number of batteries 1 required for travelling.

It is preferable that the system of the present invention, in particular, is applied to a sharing service of the electric vehicle 2. Among them, the system of the present invention is suitable for a sharing service of an electric vehicle of a dockless system. Specifically, in the dockless system, the electric vehicle 2 mounted with the exchangeable battery 1, is parked in an arbitrary place, and the user is capable of freely using the electric vehicle 2. The electric vehicle 2 is connected to the management server 4 through the internet, and the management server 4 entirely grasps the current position of the electric vehicle 2. For this reason, the management server 4 is capable of transmitting guide information of the parking place of the electric vehicle 2, to the user terminal 5 of the user. In addition, the user is capable of reserving the use of the electric vehicle 2, through the user terminal 5. In addition, a locking device is provided in each of the electric vehicles 2, and the locking device is controlled by the management server 4. For this reason, in a case where the user finds the electric vehicle 2 that the user wants to use, the user performs in-advance application with respect to the management server 4 by manipulating the user terminal 5, transmits identification information of the vehicle to the management server 4 by reading out a two-dimensional code provided in the electric vehicle 2 (for example, a QR code (Registered Trademark)) with the user terminal 5, or acquires the identification information from the vehicle by performing the near field communication with respect to the user terminal 5 and the electric vehicle 2, and transmits the identification information to the management server 4, and thus, transmits information relevant to the electric vehicle 2 that the user wants to use, to the management server 4. The management server 4 performs authentication processing with respect to the user who performs usage application of the electric vehicle 2, and in a case where the user is determined as having usage authority of the vehicle, the locking device of the electric vehicle 2 designated by the user is unlocked. Accordingly, the user is capable of getting in the designated electric vehicle 2 to move.

In addition, the locking device is also provided in a battery storage room of each of the battery stations 3, and the locking device is controlled by the management server 4. For this reason, in a case where the user uses the battery in the battery station 3, the user performs the in-advance application with respect to the management server 4 by manipulating the user terminal 5, transmits the identification information of the battery to the management server 4 by reading out a two-dimensional code provided in the battery station 3 (for example, a QR code (Registered Trademark)) with the user terminal 5, or acquires the identification information from the station by performing the near field communication with respect to the user terminal 5 and the battery station 3, and transmits the identification information to the management server 4, and thus, transmits the information relevant to the battery station 3 that the user wants to use, to the management server 4. The management server 4 performs the authentication processing with respect to the user who performs the usage application of the battery station 3, and in a case where the user is determined as having the usage authority of the battery station 3, the locking device in the vacant battery storage room of the battery station 3 is unlocked. Accordingly, the consumed battery taken out from the electric vehicle 2, is stored in the vacant battery storage room of the battery station 3, and is started to be charged, on the basis of the control from the management server 4. Further, the charged battery can be taken out from the battery storage room of the battery station 3, and thus, can be mounted on the electric vehicle 2. Furthermore, here, the consumed battery 1 is stored in the battery station 3, and then, the charged battery 1 is taken out from the battery station 3, but the present invention is not limited thereto, and the charged battery 1 may be taken out from the battery station 3, and then, the consumed battery 1 may be stored in the battery station 3.

Subsequently, a specific configuration of each device included in this system will be described in detail.

Figure 2:
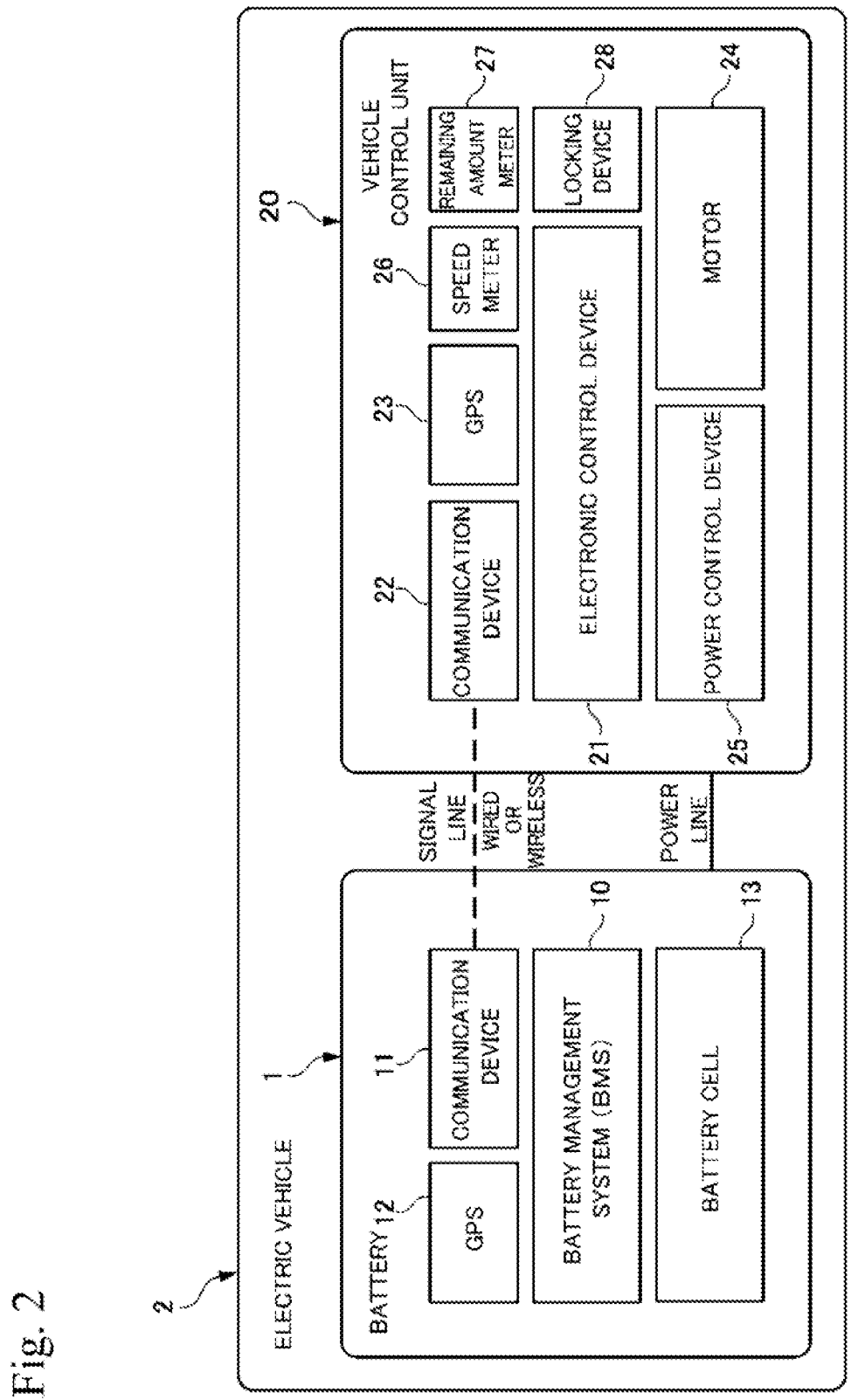
FIG. 2 is a block diagram illustrating a functional configuration of an electric vehicle.

FIG. 2 is a block diagram illustrating the configuration of the electric vehicle 2 mounting with the battery 1. The electric vehicle 2 mainly includes the exchangeable battery 1 and a vehicle control unit 20. The vehicle control unit 20 is connected to the battery 1 through a power line, receives the power supply from the battery 1, and drives a motor 24. Furthermore, the number of batteries 1 to be mounted on the vehicle, increases and decreases, according to the type of electric vehicle 2. That is, one or a plurality of batteries 1 may be mounted on the electric vehicle 2. In addition, an identification number (ID) is applied to each of the batteries 1 to be used in this system. The identification number (ID) of each of the batteries 1, is stored in a battery database 42 of the management server 4, described below, and is subjected to unified management.

The battery 1 mainly includes a battery management system (BMS) 10, a communication device 11, a global positioning system (GPS) 12, and a battery cell 13.

The battery management system 10 mainly includes an integrated circuit, various sensors, and the like. The battery management system 10 is capable of controlling one or a plurality of battery cells 13, and of measuring and calculating battery charging information including the battery remaining amount, the number of times of charging, or the like. In addition, the battery charging information to be acquired by the battery management system 10, may include the number of times of charging, the voltage, the current, the temperature, and full charge capacity of the battery, and the like, in addition to the identification number (ID) and the battery remaining amount. Furthermore, in the type or the embodiment of the battery 1, it is not necessary to provide the battery management system 10 in the battery 1.

The communication device 11 of the battery 1 has a communication function of allowing the battery charging information that the battery management system 10 acquires, to communicate with the outside. That is, it is preferable that the battery charging information to be acquired by the battery management system 10, such as the battery remaining amount, is transmitted to a remaining amount meter 27 mounted on the vehicle control unit 20, a detector 32 mounted on the battery station 3, or the like, through wired communication (CAN or the like) or near field communication (Bluetooth (Registered Trademark) or the like). In addition, the communication device 11 of the battery 1 is capable of performing bidirectional communication with respect to the management server 4, through a communication network such as the internet. That is, the communication device 11 is capable of transmitting the battery information acquired by the battery management system 10, to the management server 4, or is capable of receiving the information from the management server 4. Further, the communication device 11 of the battery 1 may transmit the information to the user terminal 5 possessed by the user, through the near field communication. Furthermore, in the type or the embodiment of the battery 1, it is not necessary to provide the communication device 11 in the battery 1.

The GPS 12 is a device which measures the current position of the battery 1, and obtains information for specifying the current position. The GPS 12 measures a time required for receiving each radiowave, on the basis of information of a radiowave transmission time included in the radiowave transmitted from a plurality of GPS satellites, and transmits time information indicating the time, to the battery management system 10. It is preferable that position information of the battery 1 acquired in the GPS 12, is transmitted to the management server 4, through the communication device 11. Furthermore, for example, in an embodiment where a GPS 23 is provided in the vehicle control unit 20, it is not necessary to provide the GPS 12 in the battery 1. In addition, in a case where the battery 1 is paired with the user terminal 5, through the near field communication, it is possible to acquire the position information of the battery 1 by using a GPS 53 of the user terminal 5, and thus, even in such a case, it is not necessary to provide the GPS 12 in the battery 1.

A secondary battery such as a known chargeable nickel-metal hydride battery or lithium ion battery, can be used in the battery cell 13.

The vehicle control unit 20 includes an electronic control device 21, a communication device 22, the GPS 23, the motor 24, a power control device 25, a speed meter 26, the remaining amount meter 27, and a locking device 28.

The electronic control device 21 controls each of elements 22 to 28 configuring the vehicle control unit 20. The electronic control device 21 can be realized by a processor such as a CPU. The electronic control device 21, for example, is capable of suitably obtaining the battery information acquired by the remaining amount meter 27, including the battery remaining amount of the battery 1, and the like, current position information of the own car, acquired by the GPS 23, and a travelling speed of the own car, measured by the speed meter 26. In addition, the electronic control device 21 is capable of performing arithmetic processing with respect to information obtained from various equipments, and of transmitting the information to the management server 4, through the communication device 22. The electronic control device 21 controls the unlocking and locking of the locking device 28, on the basis of control information from the management server 4.

The communication device 22 is capable of performing the bidirectional communication with respect to the management server 4, through the communication network such as the internet. That is, the communication device 22 is capable of transmitting the information which is subjected to the arithmetic processing by the electronic control device 21, to the management server 4, or is capable of receiving the information from the management server 4. In addition, the communication device 22 may be connected to the communication device 11 of the battery 1, in a wired or wireless manner. That is, the communication device 22 is capable of transmitting the battery information acquired by the battery management system 10, to the management server 4, or is capable of receiving the information from the management server 4. Further, the communication device 22 may transmit the information to the user terminal 5 possessed by the user, through the near field communication. Furthermore, in an embodiment where the communication device 11 is provided in the battery 1, and the communication device 11 of the battery 1 is capable of performing the bidirectional communication between the information which is subjected to the arithmetic processing by the electronic control device 21 of the electric vehicle 2, and the management server 4, through the communication network such as the internet, it is not necessary to provide the communication device 22 in the vehicle control unit 20. In addition, in a case where the electric vehicle 2 is paired with the user terminal 5, through the near field communication, it is possible to exchange the information between the electric vehicle 2 and the management server 4, by relaying the user terminal 5.

The GPS 23 is a device which measures the current position of the electric vehicle 2, and obtains information for specifying the current position. As with the GPS 12 of the battery 1, the GPS 23 of the vehicle control unit 20 measures the time required for receiving each of the radiowaves, on the basis of the information of the radiowave transmission time included in the radiowave transmitted from the plurality of GPS satellites, and transmits the time information indicating the time, to the electronic control device 21. Furthermore, in an embodiment where the GPS 12 is provided in the battery 1, it is not necessary to provide the GPS 23 in the vehicle control unit 20. In addition, in a case where the electric vehicle 2 is paired with the user terminal 5, through the near field communication, it is possible to acquire the position information of the electric vehicle 2 by using the GPS 53 of the user terminal 5, and thus, even in such as case, it is not necessary to provide the GPS 23 in the electric vehicle 2.

The motor 24 converts the power obtained from the battery 1 into rotation output, through the power control device 25, and transfers the rotation output to a power transferring mechanism. The output from the motor 24, is transferred to wheels, through the power transferring mechanism, and thus, the electric vehicle 2 travels.

The power control device 25 has a function of controlling power to be supplied from the battery cell 13 of the battery 1, and of transferring the power to the motor 24.

The speed meter 26 is a meter calculating an instantaneous travelling speed of the electric vehicle 2, on the basis of the number of rotations of the motor 24, the power transferring mechanism, or the like, or a position information acquisition device (GPS) 23. Furthermore, in the type or the embodiment of the electric vehicle 2, it is not necessary to provide the speed meter 26 in the electric vehicle 2.

The remaining amount meter 27 acquires the battery charging information including the identification number and the battery remaining amount of the battery 1, and the like. The remaining amount meter 27 may acquire the battery charging information from the battery management system 10 of the battery 1, or may directly detect and measure the identification number and the battery remaining amount of the battery 1, and the like, through wired communication (CAN or the like), wireless communication (Bluetooth (Registered Trademark) or the like), or the like, when the battery 1 is connected thereto. The battery charging information acquired by the remaining amount meter 27, is output to the electronic control device 21. Furthermore, in the type or the embodiment of the electric vehicle 2, it is not necessary to provide the remaining amount meter 27 in the electric vehicle 2.

The locking device 28 has a locking mechanism for allowing the electric vehicle 2 not to substantially travel. For example, the locking device 28 may lock the tire of the electric vehicle 2, or may lock the handle. In addition, the locking device 28 may electronically turn on or off the electric vehicle 2. In addition, the locking device 28 may simultaneously lock the battery 1 and the electric vehicle 2, or may separately lock the battery 1 and the electric vehicle 2. It is preferable that the unlocking of the locking device 28 is automatically performed by the electronic control device 21, on the basis of the control information from the management server 4. On the other hand, the locking of the locking device 28 may be automatically performed by the electronic control device 21, on the basis of the control information from the management server 4, or may be manually performed by the user.

Figure 3:
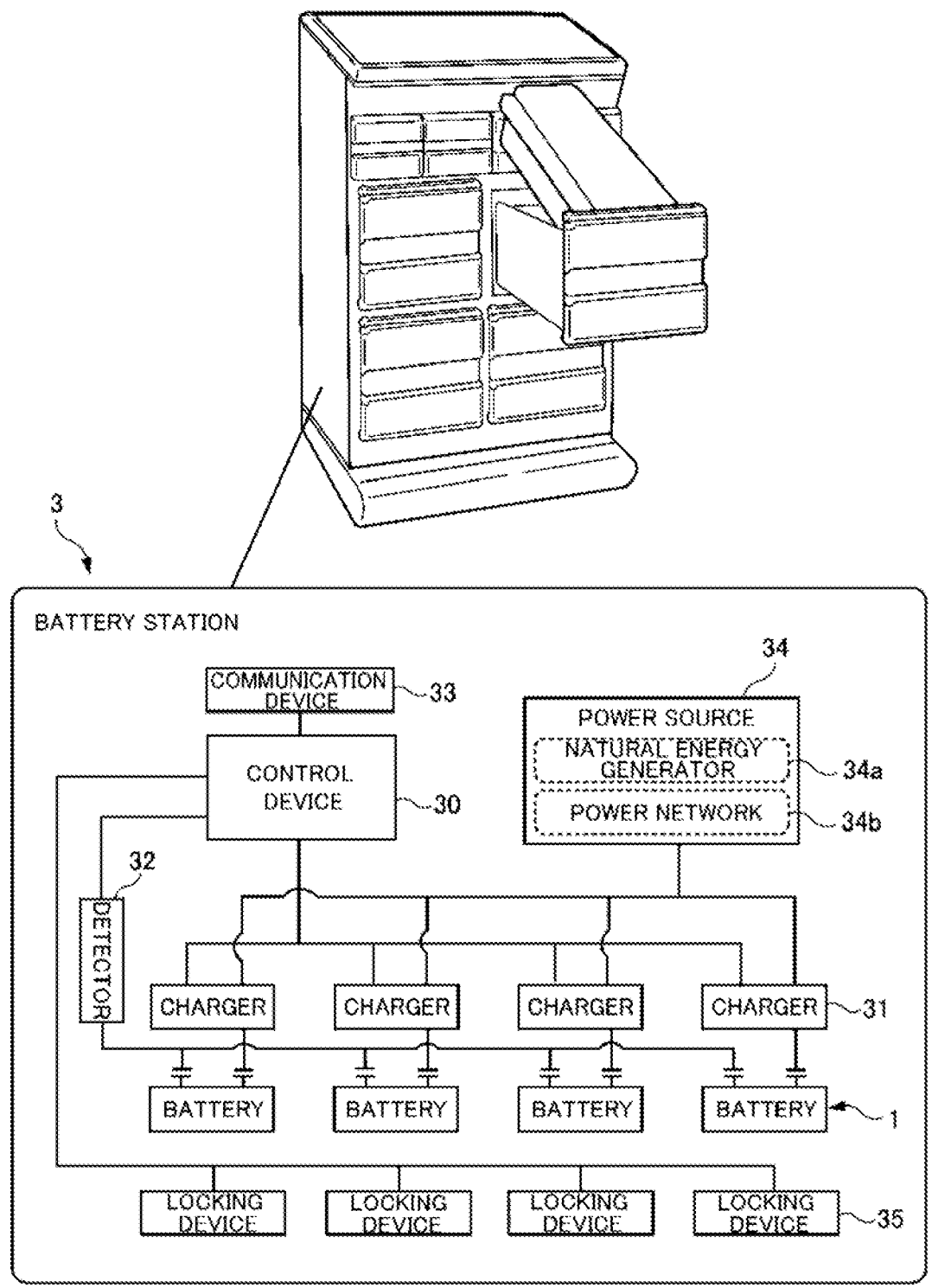
FIG. 3 is a block diagram illustrating a functional configuration of a battery station.

FIG. 3 is a block diagram illustrating the configuration of the battery station 3. The battery station 3 mainly includes a control device 30, a plurality of chargers 31, a detector 32, a communication device 33, a power source 34, and a plurality of locking devices 35. The battery 1 can be mounted on each of the plurality of chargers 31. The charger 31 mounted with the battery 1, receives power supply from the power source 34, according to the control of the control device 30, and thus, charges the battery 1.

The control device 30 of the battery station 3 is connected to the plurality of chargers 31, the detector 32, the communication device 33, and the locking device 35. For this reason, the control device 30 is capable of controlling a charging speed of the battery 1 of the charger 31, on the basis of the control information received from the management server 4, through the communication device 33. In addition, the control device 30 is capable of processing detection information which is acquired from the battery 1 by the detector 32, and of transmitting the detection information to the management server 4, through the communication device 33. Further, the control device 30 locks and unlocks the locking device 35 which is provided in each storage room of the battery 1, and thus, is capable of controlling whether or not the battery 1 is taken out.

The charger 31 is a device which is electrically connected to the battery 1, receives the power supply from the power source 34, and performs a charging manipulation with respect to the battery 1. The charger 31, for example, charges the battery 1 through a constant current-constant voltage system (a CC-CV system). The constant current-constant voltage system (the CC-CV system) is a charging system in which charging is performed at a constant current value from the initial charging, and when the voltage of the battery reaches a predetermined value as the charging progresses, the charging current value is continuously reduced while maintaining the voltage.

In addition, the charger 31 is capable of changing the charging speed of the battery 1, according to a control signal from the control device 30. For example, it is preferable that the charger 31 is capable of changing the charging speed at least in two stages of normal charging in which charging is performed at a normal speed, and high-speed charging in which charging is performed at a speed faster than the normal charging. In addition, the charger 31 may perform low-speed charging in which charging is performed at a speed slower than the normal charging, in addition to the normal charging and the high-speed charging. In addition, in the battery 1 charged in the constant current-constant voltage system, the charging speed and the charging current value are approximately in a relationship of a direct proportion, within a constant battery remaining amount range. For this reason, the charging current value to be supplied to the battery 1 from the charger 31, is controlled, and thus, it is possible to freely adjust the charging speed of the battery 1. For example, the battery 1 has an upper limit in the charging speed and the charging current value, mainly from the viewpoint of safety and durability. For this reason, charging closer to the upper limit in the charging speed and the charging current value, may be set to the high-speed charging, charging closer to a lower limit in the charging speed and the charging current value, may be set to the low-speed charging, and charging performed according to a current value between the high-speed charging and the low-speed charging, may be set to the normal charging. In other words, charging performed at a standard speed within a constant range, can be set to the normal charging, charging performed at a speed faster than the range of the normal charging, can be set to the high-speed charging, and charging performed at a speed slower than the range of the normal charging, can be set to the low-speed charging.

The detector 32 is a device for acquiring the battery charging information including the identification number, the battery remaining amount, and the like, from the battery 1 which is in a charging state. The detector 32 may acquire the battery charging information from the battery management system 10 of the battery 1, or may directly detect and measure the identification number and the battery remaining amount of the battery 1, and the like, through wired communication (CAN or the like), wireless communication (Bluetooth (Registered Trademark) or the like), or the like, when the battery 1 is connected thereto. In addition, the battery remaining amount of the battery 1, for example, is capable of measuring a charging and discharging current value of the battery 1 with the battery management system 10, and is capable of detecting the battery charging information by subtracting an electric quantity obtained by integrating the currents, from the battery remaining amount in a full charging state. The battery charging information detected by the detector 32, is transmitted to the control device 30.

The communication device 33 is a device for allowing the battery station 3 to perform the bidirectional communication with respect to the management server 4, through the communication network. The communication device 33 is capable of transmitting the information processed by the control device 30, to the management server 4, or is capable of receiving the information from the management server 4. In addition, it is possible to perform the near field communication between the communication device 33 of the battery station 3 and the communication device 11 of the battery 1.

A known power source can be adopted as the power source 34, insofar as the power source is capable of supplying power to the charger 31. For example, renewable energy obtained by a natural energy generator 34a, may be used as the power source 34. Examples of the natural energy generator 34a include a solar light generator, a solar heat generator, a wind power generator, and the like. It is preferable that the natural energy generator 34a provided in the vicinity of the battery station 3. That is, the natural energy generator 34a may be mounted on the battery station 3, or may be provided in the vicinity of the battery station 3. In addition, the battery station 3 may receive power supply from the natural energy generator 34a possessed by a power company, through a power network. In addition, commercial power to be supplied from a power network 34b, may be used as the power source 34. In addition, the power source 34 is also capable of using the renewable energy and the commercial power together. Furthermore, the power accumulated in the battery 1, can be sold in the outside, through the battery station 3. For example, the battery station 3 is capable of selling the power accumulated in the battery 1, to a power company, a company, a general household, and the like, through the power network. In addition, the battery 1 mounted on the battery station 3 is rented or exchanged, and thus, it is also possible to sell the power accumulated in the battery 1, to the user.

The locking device 35 has a locking mechanism for allowing each of the batteries 1 not to be substantially taken out from the battery station 3. The locking device 35 is provided in each of the batteries 1, and performs locking or unlocking with respect to each of the batteries 1. For example, the locking device 35 may lock the battery 1 itself into the battery station 3, or may lock a lid opening and closing the storage room of the battery 1. It is preferable that the unlocking of the locking device 35, is automatically is performed by the control device 30, on the basis of the control information from the management server 4. On the other hand, the locking of the locking device 35 may be automatically performed by the control device 30, on the basis of the control information from the management server 4, or may be manually performed by the user.

FIG. 4 is a block diagram illustrating the configuration of the management server 4. The management server 4 includes a control unit 40, a communication unit 41, a battery database 42, an electric vehicle database 43, a station database 44, and a user database 45. The management server 4 has a function of performing unified management with respect to information relevant to the battery 1, the electric vehicle 2, the battery station 3, and the user, and thus, of controlling this system. The management server 4 may execute such a function by one server device, or may execute the function by a plurality of server devices. The control unit 40 of the management server 4 reads out a program stored in a main memory, and performs predetermined arithmetic processing according to the read program.

The control unit 40 of the management server 4 is connected to the communication unit 41 and various databases 42 to 45. The control unit 40 records the information received from the battery 1, the electric vehicle 2, the battery station 3, or the user terminal 5, through the communication unit 41, in various databases 42 to 45. In addition, the control unit 40 is capable of generating a control signal with respect to the electric vehicle 2 and the battery station 3, on the basis of the information recorded in various databases 42 to 45, and of transmitting the control signal through the communication unit 41. The control unit 40 includes a processor such as a CPU.

The communication unit 41 is a device for allowing the management server 4 to perform the bidirectional communication with respect to each of the battery 1, the electric vehicle 2, the battery station 3, and the user terminal 5, through the communication network. For example, the communication unit 41 transmits the control signal generated by the control unit 40, to the electric vehicle 2 and the battery station 3. In addition, the communication unit 41 is capable of receiving various information items transmitted from the battery 1, the electric vehicle 2, the battery station 3, and the user terminal 5.

The battery database 42 is a storage unit for recording management information with respect to each of the plurality of batteries 1 to be used in this system. In FIG. 4, an example of a data structure of the battery database 42 is illustrated. As illustrated in FIG. 4, the battery database 42 stores various management information items in association with each other, by using the identification number (the battery ID) of the battery 1 as key information. The management information of the battery 1, for example, includes information relevant to the current location, the number of times of charging, the battery remaining amount, the full charge capacity, and the degree of deterioration of the battery.

In addition, the information relevant to the plurality of batteries used in the past, is recorded in the battery database 42, and thus, it is possible to obtain statistical data of the battery. In each of the batteries, the statistical data of batteries of the same type, used in the past, is recorded in the battery database 42, and thus, the management server 4 is capable of more accurately grasping the degree of deterioration of the battery, from the information. That is, it is possible to more accurately expect the degree of deterioration of the battery by being compared with statistical data items of a plurality of batteries of the same type in the past, in addition to the number of times of charging and the full charge capacity of a single battery.

An identification number of the electric vehicle 2 (a vehicle ID), an identification number of the battery station 3 (a station ID), or the like, in which the battery 1 is stored, is recorded as the information of the current location of the battery. In addition, in a case where the battery 1 is not stored in the electric vehicle 2 or the battery station 3, the current position information received from the battery 1 itself by the management server 4 (longitude and latitude information) may be recorded. In addition, in a case where the electric vehicle 2 or the battery station 3 is capable of storing a plurality of batteries, it is preferable that the current location information of the battery, is information indicating in which place of a plurality of storage places of the vehicle 2 or the battery station 3, the battery is stored. Accordingly, in a case where the battery station 3 is capable of storing the plurality of batteries 1, the management server 4 is capable of grasping which battery 1 is stored in which storage room of the battery station 3. Furthermore, in the example illustrated in FIG. 4, an identification number of which the initial letter is "V", is the identification number of the electric vehicle, an identification number of which the initial letter is "S", is the identification number of the battery station, and a number after "-" (a hyphen) is a room number of the storage room of the electric vehicle or the battery station.

In addition, information of the number of times that the battery is stored in the battery station 3, may be recorded, the number of times that the battery is fully charged, may be recorded, or the number of times that the battery remaining amount of the battery after being charged is a specified numerical value or ratio or more, may be recorded, as the information relevant to the number of times of charging of the battery. Here, a method of obtaining the number of times of charging the battery, is not limited to the method described above, and other known methods can be adopted. In addition, as illustrated in FIG. 4, it is preferable that the information relevant to the number of times of charging the battery, is recorded according to the charging speed such as the number of times of the high-speed charging, the number of times of the normal charging, and the number of times of the low-speed charging. The number of times of charging is counted according to the charging speed, and thus, it is possible to improve the accuracy of calculating the degree of deterioration of the battery.

In addition, it is preferable that the latest battery charging information transmitted by the electric vehicle 2 or the battery station 3, is recorded as the battery charging information including the identification number and the battery remaining amount of the battery, and the like. That is, in a case where the current location of the battery 1 is in the electric vehicle 2, the battery charging information transmitted from the communication device 22 of the electric vehicle 2 to the management server 4, is recorded. In addition, in a case where the current location of the battery 1 is in the battery station 3, the battery charging information transmitted from the communication device 33 of the battery station 3 to the management server 4, is recorded. In addition, in a case where the battery 1 is not stored in any one of the electric vehicle 2 and the battery station 3, the battery charging information directly transmitted from the battery 1 to the management server 4, is recorded. Furthermore, in the battery database 42, it is preferable that the battery charging information is constantly updated to the latest battery charging information.

In addition, it is preferable that rated full charge capacity and full charge capacity of the battery are recorded as the information relevant to the full charge capacity of the battery. In FIG. 4, in addition to the full charge capacity, the rated full charge capacity is represented in the parentheses. In a case where the battery 1 includes the battery management system 10 capable of measuring and calculating the full charge capacity, the full charge capacity of the battery 1 may be measured and calculated by the battery management system 10.

In addition, in a case where the battery 1 does not includes the battery management system 10, or in a case where even though the battery 1 includes the battery management system 10, in practice, the battery management system 10 does not measure and calculate the full charge capacity, it is preferable that the full charge capacity or the like, corrected by the control unit 40 in consideration of the rated full charge capacity before the battery is started to be used (at the time of being in a brand-new state), and the deterioration of the battery, is recorded in the battery database 42. In general, the value of the full charge capacity decreases, as the number of usages of the battery increases. At this time, it is preferable that the full charge capacity is a value obtained by correcting the rated full charge capacity, on the basis of the number of times of the high-speed charging, the number of times of the normal charging, and the number of times of the low-speed charging. Further, there is a case where the battery further deteriorates in the high-speed charging than in the normal charging, and the battery further deteriorates in the normal charging than in the low-speed charging. Accordingly, in this case, it is preferable that the full charge capacity is obtained by changing the weighting of an influence rate on the deterioration of the battery, according to the high-speed charging, the normal charging, and the low-speed charging. Thus, the number of times of the high-speed charging, the normal charging, and the low-speed charging of each of the batteries is recorded in the battery database 42, and the recording of the number of times of charging is compared with the statistical data in the past, and thus, it is possible to accurately presume the full charge capacity. Furthermore, the calculation of obtaining the full charge capacity described above, is performed by the control unit 40, on the basis of the information relevant to the number of times of charging, recorded in the battery database 42, and the information relevant to the rated full charge capacity. Here, a method of obtaining the full charge capacity of the battery, is not limited to the method described above, and other known methods can be adopted. For example, an electric resistance value at the time of charging the battery 1, may be sequentially recorded, and thus, the full charge capacity may be obtained. In addition, for example, a memory for sequentially storing the full charge capacity in the battery 1 itself, other than the battery management system 10, can also be mounted.

In addition, the information relevant to the degree of deterioration of the battery, is calculated by the control unit 40, on the basis of the information recorded in the battery database 42. For example, the degree of deterioration may be ranked in five stages from A (new) to E (old). For example, a degree A of deterioration indicates a brand-new state or a state close thereto, and a degree E of deterioration indicates that it is necessary that the battery is discarded. In addition, as an example of ranking, the full charge capacities are compared with each other by the control unit 40, and thus, a reduction degree from the rated full charge capacity to the actual full charge capacity can be obtained as the degree of deterioration. However, in practice, there is a case where the variation or the accuracy of the full charge capacity measured and calculated from a single battery, by the battery management system 10 or the like, is low according to an external environment or a usage load. In this case, it is also preferable to obtain the degree of deterioration corrected on the basis of the number of times of the high-speed charging, the number of times of the normal charging, and the number of times of the low-speed charging. Thus, the number of times of the high-speed charging, the normal charging, and the low-speed charging of each of the batteries, is recorded in the battery database 42, and the recording of the number of times of charging is compared with the statistical data in the past, and thus, it is possible to more accurately presume the degree of deterioration. Here, a method of obtaining the degree of deterioration of the battery, is not limited to the method described above, and other known methods can be adopted.

Further, in this system, it is preferable that the category of the electric vehicle 2 or the other electric equipments, which can be used, is set, according to the degree of deterioration of the battery 1. For example, as illustrated in FIG. 4, the category of the electric vehicle 2 is classified into a large-size electric vehicle such as an electric automobile and a small-size electric vehicle such as an electric scooter or an electric bicycle. In addition, the category of the other electric equipments is classified into a portable power source such as an electric tool or exterior illumination equipment and a stationary storage battery such as a household storage battery or a storage battery for a power system. Then, the management server 4 determines in which category of the electric vehicle or the other electric equipments, each of the batteries 1 is used, according to the degree of deterioration. For example, the battery of the degree A of deterioration is used in a power source for a large-size electric vehicle, a battery of a degree B of deterioration is used in a power source for a small-size electric vehicle, a battery of a degree C. of deterioration is used in a portable power source, and a battery of a degree D of deterioration is used in a power source for a stationary storage battery. Thus, the management server 4 manages the category of the electric vehicle or the like, in which the battery 1 can be used, according to the degree of deterioration of each of the batteries 1. For example, the management server 4 may control each of the batteries 1, each of the electric vehicles 2, or each of the electric equipments, such that power from the battery 1 is not supplied to the electric vehicle 2 or the electric equipment of a different category. In addition, the management server 4 is capable of controlling a locking state of the lid of the battery storage room of the battery station 3, such that the user of the electric vehicle 2 or the electric equipment is not capable of accepting the battery 1 of a different category. Accordingly, it is possible to use each of the batteries in an optimal usage, according to the degree of deterioration of the battery.

It is preferable that the identification number (the vehicle ID), the current position of the vehicle, the type of vehicle, usage history of the battery, and the like are recorded in the electric vehicle database 43, in association with each of the plurality of electric vehicles 2 included in this system. The information relevant to the type of vehicle includes information relevant to the type, the weight, the fuel consumption, and the model year of the electric vehicle 2, or the category relevant to the usage of the battery 1 described above. The usage history of the battery includes the identification number (ID) of the battery used in the electric vehicle 2, the identification number (ID) of the battery station in which battery is available, and the like.

It is preferable that the identification number (the station ID), the current location, the usage history of the battery, the charging history of the battery, and the like are recorded in the station database 44, in association with each of the plurality of battery stations 3 in this system. The usage history of the battery includes information such as the number of times of taking out the battery 1 from the battery station 3, the date, the date and time, the weather, and the identification number of the taken battery 1. The charging history of the battery includes information such as the identification number of the battery which is charged in the battery station.

It is preferable that the identification number (the user ID), a password, a name, a contact name, paying account information of usage fee (or credit card information), the type of electric vehicle which can be used by the user, an individual identification number of the user terminal 5 possessed by the user, and the like are recorded in the user database 45, in association with each of the users of the this system. In addition, in a case where the management server 4 acquires the current position information from the user terminal 5, the current position information can be continually recorded in the user database 45. When the user transmits the usage start application of the electric vehicle 2, to the management server 4, the authentication processing of whether or not the user has the usage authority of the electric vehicle 2 in the management server 4, or whether or not the user has the paying capacity of the usage fee relevant to the electric vehicle 2, is performed by referring to the user database 45.

As illustrated in FIG. 4, it is preferable that the control unit 40 of the management server 4, includes a function unit such as an exchangeability evaluation unit 40*a*, a promotion transmission unit 40*b*, a charging and discharging necessity evaluation unit 40*c*, a charging and discharging control unit 40*d*, and a battery usage management unit 40*e*. The control unit 40 reads out a program stored in a main memory, and executes the read program, and thus, each of the function units 40*a* to 40*e* functions. The details of each of the function units 40*a* to 40*e* will be described below.

Figure 5:
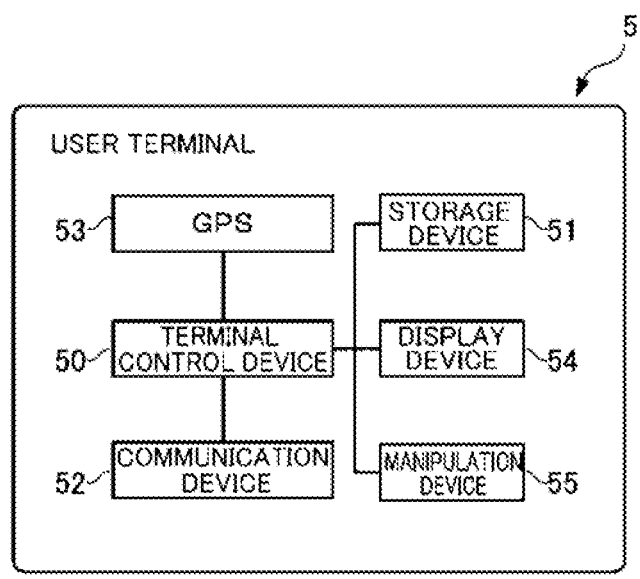
FIG. 5 is a block diagram illustrating a functional configuration of a user terminal.

FIG. 5 is a block diagram illustrating the configuration of the user terminal 5. The user terminal 5 is a mobile terminal such as a smart phone or a tablet type terminal, and is possessed by the user who wants to use the electric vehicle 2. The user terminal 5 includes a terminal control device 50, a storage device 51, a communication device 52, a GPS 53, a display device 54, and a manipulation device 55. Furthermore, here, an example of the function of the user terminal 5 is described, but the user terminal 5 may have a normal function of a known smart phone or the like.

The terminal control device 50 of the user terminal 5 performs processing of controlling the other elements 51 to 55 of the user terminal 5. A processor such as a CPU, can be used as the terminal control device 50. The terminal control device 50 reads out an application program (a computer program) stored in the storage device 51, and controls the other elements according to the application program. In addition, the terminal control device 50 is capable of suitably writing in or reading out an arithmetic result according to the application program, with respect to the storage device 51.

The storage device 51 of the user terminal 5 is an element for storing information to be used in the arithmetic processing or the like of the terminal control device 50. Specifically, the storage device 51 stores an application program of allowing a versatile mobile type information communication terminal to function as the user terminal 5 of the battery management system 100 according to the present invention. The application program may be downloaded on the user terminal 5 through the internet, or may be pre-installed in the user terminal 5. Furthermore, other programs may be stored in the storage device 51, in addition to the application program for this system. In a case where application program for this system is activated according to an instruction from the user, the processing according to the program, is executed. In addition, user-specific identification information, user terminal-specific individual identification information, or the like is stored in the storage device 51. A storage function of the storage device 51, for example, can be realized by a non-volatile memory such as an HDD and an SDD. In addition, the storage device 51 may have a function as a memory for writing in or reading out an interim progress of the like of the arithmetic processing by the terminal control device 50. A memory function of the storage device 51 can be realized by a volatile memory such as a RAM or a DRAM.

The communication device 52 of the user terminal 5 is a device for exchanging information with respect to the management server 4, through a communication network such as the internet. The communication device 52 is capable of transmitting various information items to the management server 4, or of receiving various information items from the management server 4, according to the control of the terminal control device 50. In addition, the communication device 52 of the user terminal 5 may have a function of performing near field communication in the battery 1, the electric vehicle 2, and the battery station 3.

The GPS 53 is a device which measures the current position of the user terminal 5, and obtains information specifying the current position. The GPS 53 of the user terminal 5, measures the time required for receiving each of the radiowaves, on the basis of the information of the radiowave transmission time included in the radiowave transmitted from the plurality of GPS satellites, and transmits the time information indicating the time, to the terminal control device 50, as with the GPS 12 of the battery 1, or the like.

The display device 54 is a display displaying a predetermined image or the like, according to the control of the terminal control device 50. A known display such as a liquid crystal display or an organic EL, may be used as the display device 54.

The manipulation device 55 is an element for receiving the input of the information with respect to the user terminal 5 from the user. The information input through the manipulation device 55, is transferred to the terminal control device 50. Various input devices used in a known information communication terminal, can be adopted as the manipulation device 55. Examples of the manipulation device 55 include a touch panel, a button, a cursor, a microphone, a keyboard, and a mouse, but manipulation device 55 is not limited thereto. In addition, touch panel display may be configured by overlaying a touch panel on a display.

Figure 6:
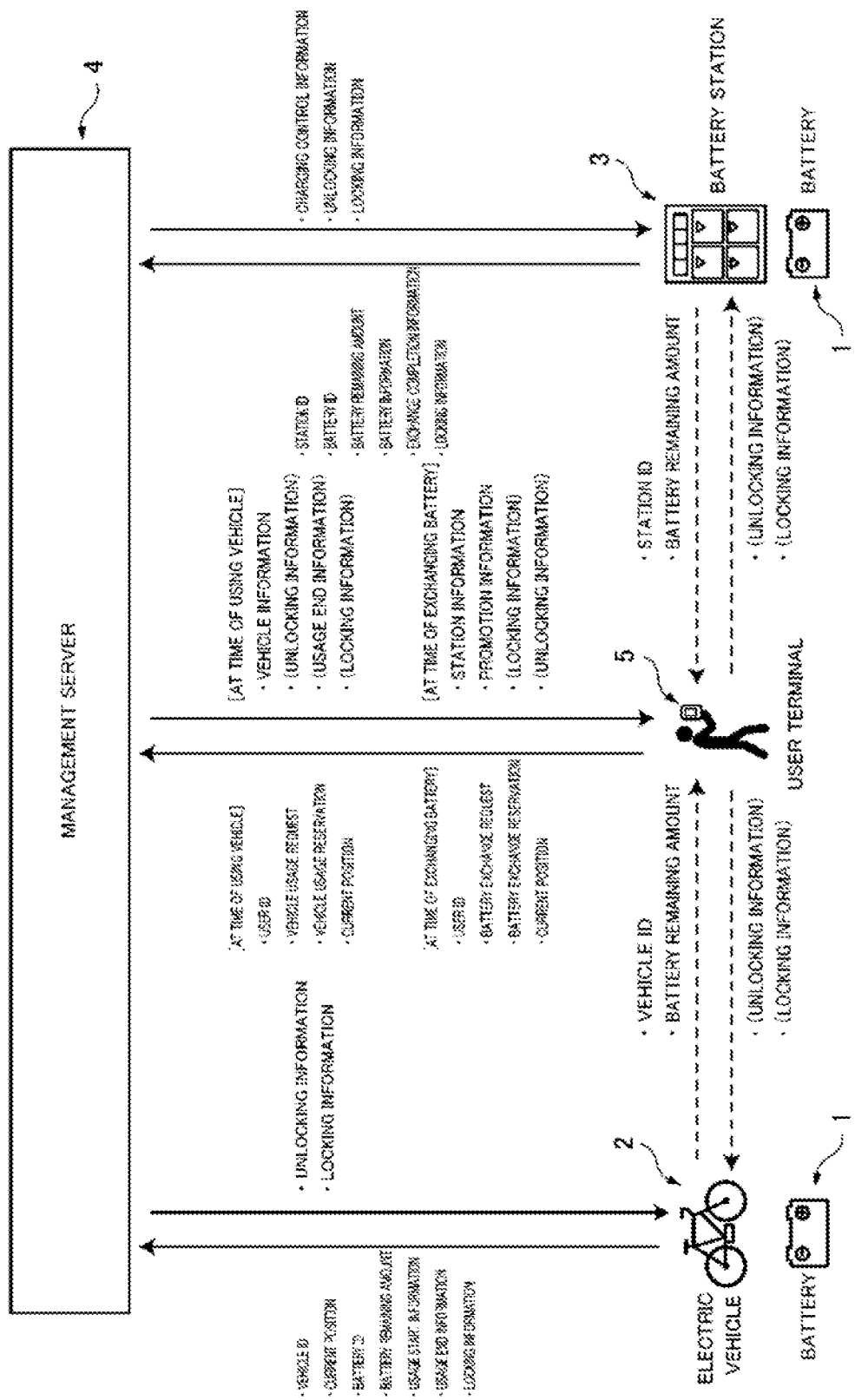
FIG. 6 illustrates an example of information exchanged in the management server, the electric vehicle, the user terminal, and the battery station.

Subsequently, the outline of information to be exchanged in the battery management system 100 according to the present invention when the user uses the electric vehicle 2, and when the user performs battery exchange of the electric vehicle 2 in the battery station 3, will be described with reference to FIG. 6. In particular, FIG. 6 illustrates an embodiment in which the system of the present invention is applied to the sharing service of the electric vehicle 2.

First, a flow of information processing when the user uses the electric vehicle 2, will be described. The electric vehicle 2 acquires the current position information by the GPS 23, and periodically transmits the acquired position information to the management server 4, along with the vehicle ID thereof. In addition, the electric vehicle 2 measures the battery remaining amount of the battery 1 mounted thereon, and periodically transmits the measured battery remaining amount to the management server 4, along with the battery ID. For this reason, the management server 4 grasps the current position and the remaining amount of the battery 1, with respect to each of the electric vehicles 2. For this reason, the user transmits the current position information acquired by the GPS 53 of the user terminal 5, to the management server 4, and thus, is capable of obtaining the vehicle information such as the position of the electric vehicle 2 existing in the vicinity of the current position of the user, the type of the electric vehicle 2, or the remaining amount of the battery 1 mounted on the electric vehicle 2, from the management server 4. For example, the vehicle information of the electric vehicle 2 in the vicinity of the current position of the user, is displayed on the display device 54 of the user terminal 5.

Next, in a case where the user actually finds the electric vehicle 2 that the user wants to get in, for example, the user reads out the two-dimensional code provided in the electric vehicle 2 (a QR code (Registered Trademark) or the like), in the user terminal 5. The two-dimensional code of the electric vehicle 2 is obtained by coding the vehicle ID of the electric vehicle 2, or the like, and the user terminal 5 reads out the two-dimensional code, and thus, it is possible to acquire the vehicle ID of the electric vehicle 2 that the user wants to get in. In addition, for example, the near field communication may be performed between the electric vehicle 2 and the user terminal 5, and the vehicle ID may be transmitted from the electric vehicle 2 to the user terminal 5, instead of reading out the two-dimensional code. In addition, at this time, it is possible to transmit the remaining amount information of the battery 1 from the electric vehicle 2 to the user terminal 5.

In a case where the user acquires the vehicle ID of the electric vehicle 2, the user transmits a usage request of the vehicle from the user terminal 5 to the management server 4. The usage request of the vehicle includes information such as the user ID of the user, the password of each of the users, and the vehicle ID of the electric vehicle 2 that the user wants to get in. In a case where a vehicle usage request is received from the user terminal 5, the management server 4 performs the authentication processing of confirming whether or not the user has the usage authority of the electric vehicle 2. For example, the management server 4 confirms whether or not the password of the user who performs the usage request, is correct. In addition, in a case where a user account has an expiration date, the management server 4 may confirm whether or not it is within the expiration date, or may confirm whether or not a credit card for paying the usage fee, is within the expiration date. In addition, in a case where there is a limit in the type of the electric vehicle 2 capable of being used in the user account, the management server 4 confirms whether or not the type of the electric vehicle 2 according to the usage request, can be used by the user. Further, in a case where usage reservation of the electric vehicle 2 can be performed, the management server 4 confirms whether or not the electric vehicle 2 according to the usage request of a certain user, is reserved in advance by the other user. According to the authentication processing, in a case where the user is determined as a person who has the usage authority of the electric vehicle 2, the management server 4 transmits unlock information (an unlocking command) of the locking device 28, to the electric vehicle 2, through the internet. Accordingly, the locking device 28 of the electric vehicle 2 is unlocked, and thus, the user is capable of using the electric vehicle 2. Furthermore, for example, the management server 4 may transmit the unlock information to the user terminal 5, through the internet, or may transmit the unlock information from the user terminal 5 to the electric vehicle 2, through the near field communication, instead of transmitting the unlock information from the management server 4 to the electric vehicle 2.

In addition, in a case where the user actually finds the electric vehicle 2, the user is capable of transmitting in advance the usage reservation of the electric vehicle 2, to the management server 4, instead of transmitting the usage request to the management server 4 on site. For example, the information relevant to the usage reservation of the vehicle, may include information of a usage start reserved date and time or a usage end scheduled date and time, in addition to the user ID of the user, the password of the user, and the vehicle ID of the electric vehicle 2 that the user wants to get in. In this case, the management server 4 restricts the electric vehicle 2 reserved by a certain user such that other users are not capable of using the electric vehicle 2 until the usage start reserved date and time.

In a case where the user starts the use of the electric vehicle 2, the electric vehicle 2 transmits the usage start information to the management server 4. The usage start information, for example, includes information relevant to a usage start place or a usage start date and time. In addition, it is preferable that the electric vehicle 2 periodically transmits the current position information to the management server 4, during a usage period of the user. Thus, the electric vehicle 2 periodically transmits the current position information to the management server 4, and thus, the management server 4 is capable of grasping a movement path of each of the electric vehicles 2.

In a case where the user ends the use of the electric vehicle 2, the electric vehicle 2 transmits the usage end information to the management server 4. The usage end information, for example, includes information relevant to a usage end place or a usage end date and time. In addition, the user manually locks the locking device 28 of the electric vehicle 2 at the time of ending the electric vehicle 2. When the locking device 28 is locked, the electric vehicle 2 transmits the locking information to the management server 4. Accordingly, the management server 4 is capable of grasping that the use of the electric vehicle 2 is ended, or the electric vehicle 2 is locked. Furthermore, in the management server 4, it is possible to control the locking of the electric vehicle 2. For example, in a case where it is determined that the electric vehicle 2 is not locked for a constant period after the use of the electric vehicle 2 is ended, the management server 4 transmits the locking information (a locking command) to the electric vehicle 2, and locks the electric vehicle 2. In addition, for example, in a case where there is a usage available time of the electric vehicle 2 is limited in advance, the management server 4, first, transmits the usage end information to the user terminal 5, and informs the user that usage end time is approaching. After that, in a stage where it is confirmed that the user gets out of the electric vehicle 2, the management server 4 transmits the locking information to the electric vehicle 2. Furthermore, for example, the management server 4 may transmit the locking information to the user terminal 5, through the internet, and may transmit the locking information from the user terminal 5 to the electric vehicle 2, through the near field communication, instead of transmitting the locking information from the management server 4 to the electric vehicle 2.

Subsequently, a flow of the information processing when the user exchanges the battery of the electric vehicle 2, will be described. First, the battery station 3 periodically transmits battery information including the battery ID or the battery remaining amount of each of one or the plurality of batteries 1 stored therein, to the management server 4, along with the station ID thereof. In addition, the battery information may include the number of times of charging of the battery, the number of times of the low-speed charging, the number of times of the normal charging, the number of times of the high-speed charging, or the like. Accordingly, the management server 4 is capable of grasping the battery remaining amount or the degree of deterioration with respect to each of the batteries 1 in the battery station 3.

The user transmits the current position information acquired by the GPS 53 of the user terminal 5, to the management server 4 at every time when the battery 1 of the electric vehicle 2 is exchanged, and thus, is capable of obtaining station information of the battery station 3 existing in the vicinity of the current position of the user, from the management server 4. The station information includes the position information of the battery station 3, or the information relevant to the battery 1 stored in the battery station 3. The information relevant to the battery 1, for example, includes information relevant to the battery remaining amount of the battery 1, or the category of the vehicle in which the battery 1 can be used. For example, the information of the battery station 3 in the vicinity of the current position of the user, is displayed on the display device 54 of the user terminal 5. Furthermore, the user is also capable of exchanging the battery 1 by stopping by the battery station 3, without confirming in advance the position of the battery station 3 or making a reservation in advance.

In addition, the management server 4 is also capable of transmitting the promotion information relevant to the battery exchange, to the user terminal 5. The promotion information includes the information relevant to the battery station 3 to which the user is led, and information such as a privilege to be applied to the user. The promotion information, for example, includes the information of a store in which the battery station 3 is provided, a coupon capable of being used in the store, and the like. Alternatively, the promotion information may include information such as a point to be applied to the user (a point having a monetary value, which can be used in this system) in a case where the user performs the battery exchange in the battery station 3 designated by the management server 4. Accordingly, it is possible to lead the user to the battery station 3 convenient for the operator of the system, or to apply a motivation of performing the battery exchange in the designated battery station 3, to the user.

In a case where the user arrives at the battery station 3 on the electric vehicle 2, for example, the user reads out the two-dimensional code provided in the battery station 3 (a QR code (Registered Trademark) or the like), in the user terminal 5. In addition, in a case where the battery station 3 includes a plurality of storage rooms, the two-dimensional code may be provided in each of the storage rooms of the battery station 3. The two-dimensional code of the battery station 3 is obtained by coding the station ID of the battery station 3, the room number of the storage room storing the battery 1, and the like. For this reason, the user terminal 5 reads out the two-dimensional code, and thus, it is possible to acquire the ID of the battery station 3 or the storage room in which the battery 1 to be exchanged is stored. In addition, for example, the near field communication may be performed between the battery station 3 and the user terminal 5, and the station ID or the ID of the storage room may be transmitted from the battery station 3 to the user terminal 5, instead of reading out the two-dimensional code. In addition, at this time, it is possible to transmit the remaining amount information of the battery 1 from the battery station 3 to the user terminal 5.

The user transmits a request for battery exchange, from the user terminal 5 to the management server 4. The request for battery exchange includes information such as the user ID of the user, the password of the user, the vehicle ID of the electric vehicle 2 to be subjected to the battery exchange, the station ID of the battery station 3, and the ID of the storage room in which the battery 1 is stored. In a case where the battery exchange usage request is received from the user terminal 5, the management server 4 performs the authentication processing of confirming whether or not the user has the authority of exchanging the battery in the battery station 3. For example, the management server 4 confirms whether or not the password of the user who performs an exchange request, is correct. In addition, as described above, in a case where the category of the vehicle in which the battery can be used, is limited according to the degree of deterioration of the battery 1, the management server 4 confirms whether or not the category of the vehicle in which the battery 1 stored in the battery station 3, can be used, is coincident with the electric vehicle which is a target of the battery exchange. Further, in a case where the battery exchange can be reserved, the management server 4 confirms whether or not the battery 1 according to the exchange request of a certain user, is reserved in advance to be exchanged by the other user. According to the authentication processing, in a case where the user is determined as a person who has the exchange authority of the battery 1, the management server 4 transmits unlock information (unlocking command) of the locking device 35, to the battery station 3, through the internet. Accordingly, the locking device 35 of the battery 1 is unlocked, and the user is capable of taking out the charged battery 1 from the battery station 3. Furthermore, for example, the management server 4 may transmit the unlock information to the user terminal 5, through the internet, and may transmit the unlock information from the user terminal 5 to the battery station 3, through the near field communication, instead of transmitting the unlock information from the management server 4 to the battery station 3.

In addition, the user detaches the consumed battery 1 from the electric vehicle 2, and attaches the charged battery 1 taken out from the battery station 3, to the electric vehicle 2. In addition, the user stores the consumed battery 1 detached from the electric vehicle 2, in the battery station 3. In a case where the battery station 3 accepts the consumed battery 1, the battery station 3 transmits exchange completion information to the management server 4. The exchange completion information includes information relevant to the charged battery 1 provided to the user (the battery ID or the like), and information relevant to the consumed battery 1 provided from the user (the battery ID or the like). Then, the battery station 3 charges the battery 1, according to the control of the management server 4. At this time, charging control information is transmitted from the management server 4 to the battery station 3. The charging control information includes a command of charging or discharging the battery 1, a command relevant to a charging speed and a discharging speed. The battery station 3 controls the charging and discharging of each of the batteries 1, and the speed thereof, according to the charging control information generated by the management server 4.

In addition, the user manually locks the locking device 35 of the battery station 3, after the exchange of the battery is completed. When the locking device 35 is locked, the battery station 3 transmits the locking information to the management server 4. Accordingly, the management server 4 is capable of grasping that the exchange of the battery is completed, and the battery station 3 is locked. Furthermore, in the management server 4, it is also possible to control the locking of the battery station 3. For example, in a case where it is determined that the electric vehicle 2 is not locked for a constant period, after the exchange of the battery 1 is ended, the management server 4 transmits the locking information (the locking command) to the battery station 3, and locks the storage room of the battery 1. Furthermore, for example, the management server 4 may transmit the locking information to the user terminal 5, through the internet, and may transmit the locking information from the user terminal 5 to the battery station 3, through the near field communication, instead of transmitting the locking information from the management server 4 to the battery station 3.

Furthermore, here, an example has been described in which the electric vehicle 2 performs communication with respect to the management server 4 or the user terminal 5. Here, in a case where the battery 1 mounted on the electric vehicle 2, has a communication function with respect to the outside, the electric vehicle 2 may transmit and receive the entire or a part of the information transmitted and received with respect to the management server 4 or the user terminal 5, with respect to the battery 1 and the management server 4 or the user terminal 5. Similarly, here, an example has been described in which the battery station 3 performs communication with respect to the management server 4 or the user terminal 5. Here, in a case where the battery 1 stored in the battery station 3, has a communication function with respect to the outside, the battery station 3 may transmit and receive the entire or a part of the information transmitted and received with respect to the management server 4 or the user terminal 5, with respect to the battery 1 and the management server 4 or the user terminal 5.

Figure 7:
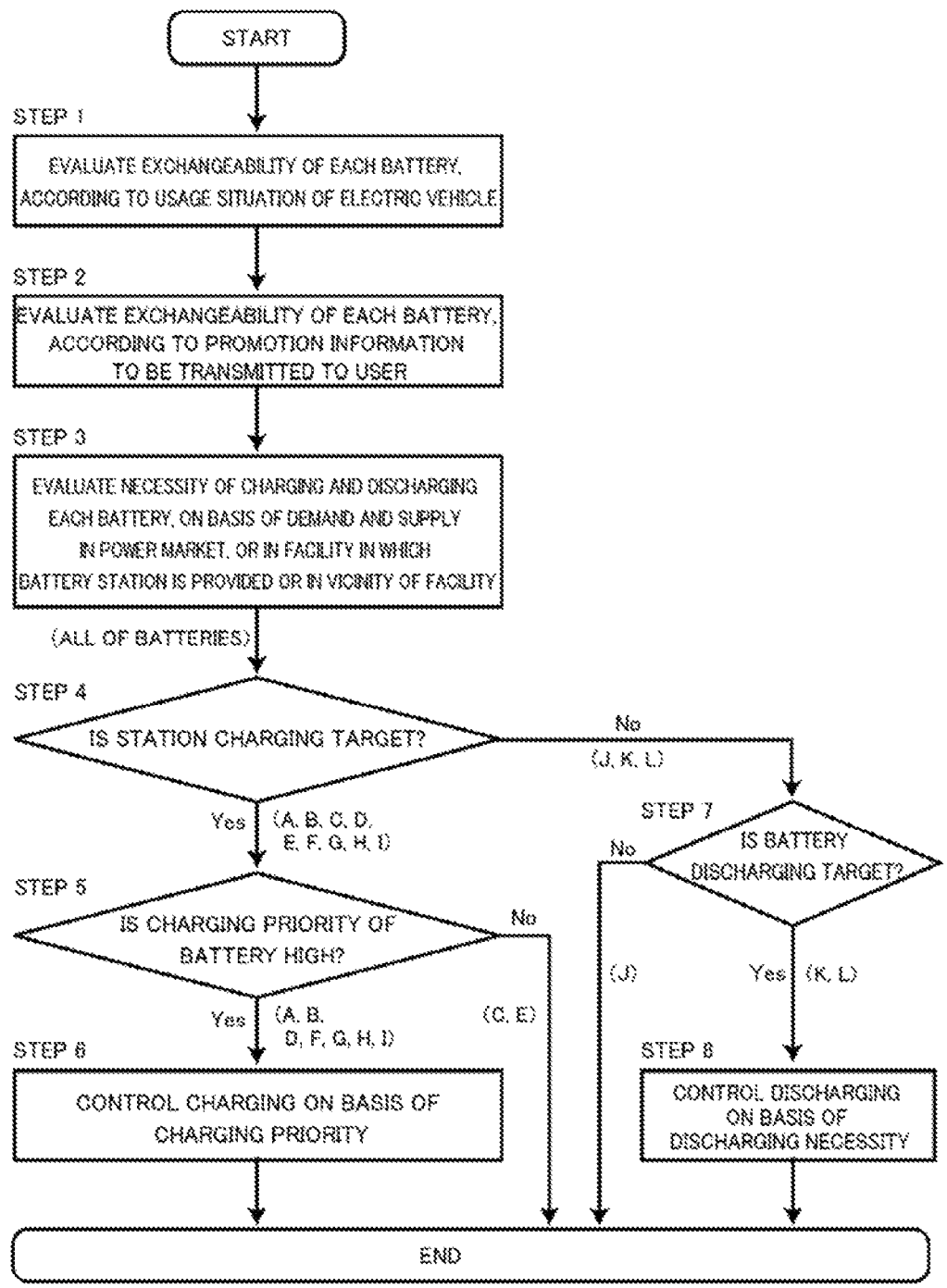
FIG. 7 is a flow diagram illustrating an example of charging control information generation processing in the management server.
Figure 9:
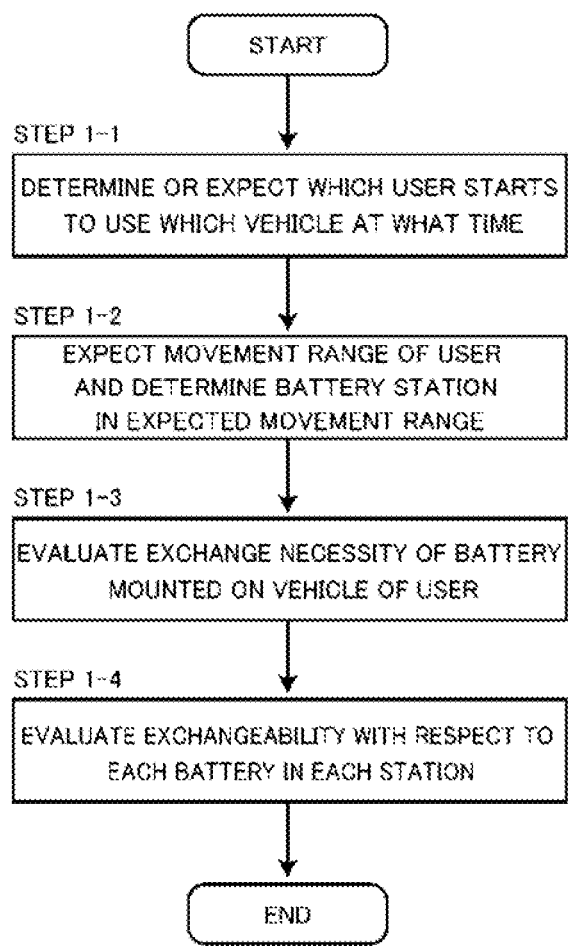
FIG. 9 is a flow diagram illustrating the details of processing (STEP 1) of evaluating exchangeability of a battery, according to a usage situation of the electric vehicle.
Figure 10:
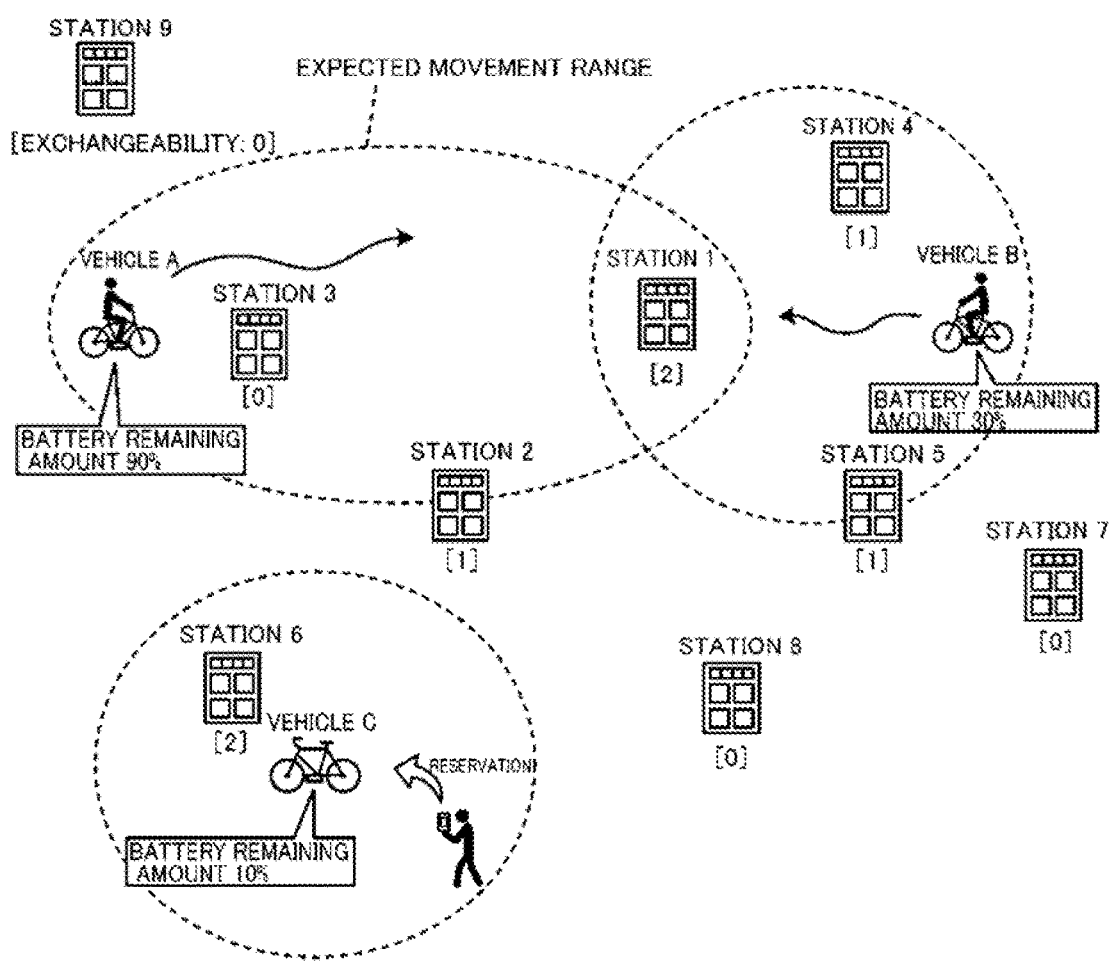
FIG. 10 schematically illustrates an example of a method of evaluating the exchangeability of the battery according to the usage situation of the electric vehicle.

Subsequently, a flow of processing in which the management server 4 generates the charging control information of the battery 1 in the battery station 3, will be described with reference to FIG. 7 to FIG. 10. FIG. 7 illustrates a main flow of charging control information generation processing, and FIG. 8 illustrates an example of a score table in which the charging speed of each of the batteries 1 is quantitatively determined, according to the flow of FIG. 7. In addition, FIG. 9 illustrates a sub-flow of STEP 1 illustrated in FIG. 7, and FIG. 10 schematically illustrates a position relationship between the electric vehicle 2 and the battery station 3.

As illustrated in FIG. 7, first, the exchangeability evaluation unit 40a of the management server 4 quantitatively evaluates the exchangeability of each of the batteries, according to the usage situation of the plurality of electric vehicles included in the this system (STEP 1). The usage situation of the electric vehicle includes at least the position information of each of the electric vehicles 2, and the information relevant to the battery remaining amount of the battery 1 mounted on each of the electric vehicles 2. In particular, it is preferable that the position information of the electric vehicle 2, is position information of a spot in which the user starts to use the electric vehicle 2. For example, in a case where the user starts to use the electric vehicle 2 on which the battery 1 having a low battery remaining amount, is mounted, the battery stored in the battery station 3 existing in the vicinity of the electric vehicle 2, is evaluated as having high exchangeability. On the other hand, in a case where the user starts to use the electric vehicle 2 on which the battery 1 having a high battery remaining amount, is mounted, the battery stored in the battery station 3 existing in the vicinity of the electric vehicle 2, is evaluated as having low exchangeability. In addition, the exchangeability evaluation unit 40a may assume a marginal spot of a range in which the electric vehicle 2 is capable of travelling, on the basis of the position information of the electric vehicle 2 at the time of starting the use of the electric vehicle 2, and the battery remaining amount of the battery 1 mounted thereon. Then, the exchangeability evaluation unit 40a evaluates that the exchangeability of the battery 1 stored in the battery station 3 existing in the vicinity of the marginal spot of the range in which the electric vehicle 2 is capable of travelling, is high. That is, in a case where the electric vehicle 2 smoothly travels, in the vicinity of a spot in which the battery remaining amount of the battery 1 is low, the user considers that the possibility of exchanging the battery 1 of the electric vehicle 2 is high. Thus, the exchangeability evaluation unit 40a may evaluate exchangeability of the battery 1 in each of the battery stations 3, on the basis of the position information of the electric vehicle 2 at a usage start time point of the user, the battery remaining amount, or the like. Accordingly, the user is capable of quickly controlling the charging speed of the battery 1, or the like, from a time point when the electric vehicle 2 is started to be used, and thus, it is possible to avoid a situation in which the charging of the battery 1 is not completed even though the user arrives at the battery station 3.

In addition, a travelling direction of the electric vehicle 2, a distribution density of the electric vehicle 2, a distribution density of the user of the electric vehicle 2, usage history of the electric vehicle 2, and the like may be considered as the usage situation of the electric vehicle. The exchangeability of each of the batteries 1 is evaluated in consideration of such a compositive usage situation, and thus, it is possible to increase an accuracy of evaluation processing. Furthermore, in STEP 1, the details of the evaluation method will be described below in more detail, with reference to FIG. 9 and FIG. 10.

Next, the exchangeability evaluation unit 40a of the management server 4 further evaluates the exchangeability of each of the batteries 1, according to the promotion information transmitted from the promotion transmission unit 40b to the user (STEP 2). For example, the promotion transmission unit 40b of the management server 4, for example, transmits the promotion information for leading the user terminal 5 to the battery station 3 designated on the management server 4 side, at a timing such as when the electric vehicle 2 departs, when the electric vehicle 2 travels, or when the use of the electric vehicle 2 is ended. For example, when a vehicle usage request or a vehicle usage reservation, or a battery exchange request or a battery exchange reservation is received from the user terminal 5, the promotion transmission unit 40b may transmit the promotion information. The contents of the promotion information are not particularly limited, and an advertisement of a store in which the battery station 3 is provided, and the contents which provide a profit to the user, are preferable as the contents. For example, the promotion information may present that a coupon, a point, or money is granted to the user. Thus, the battery 1 stored in the battery station 3 which is a target of the promotion information, has a high possibility of the battery exchange of the user. Therefore, the exchangeability evaluation unit 40a evaluates the exchangeability of each of the batteries, according to the contents of the promotion information. For example, in a case where the promotion information including a coupon having a high value, or the like, is transmitted to the user, by using the battery 1 in a certain battery station 3, as a target, the exchangeability evaluation unit 40a evaluates that the exchangeability of the battery 1 is high. Thus, the exchangeability may be evaluated on the basis of the height of the value of the promotion information.

For example, the followings are considered as a condition of transmitting the promotion information.

<1. Case of Transmitting Promotion Information at Time of Departure>

1a. In the battery station 3 in the vicinity of a departure spot of the electric vehicle 2, the charged battery 1 is insufficient, or electric power selling (discharging) is planned to be performed according to a request from the power market, or the facility in which the battery station is provided or the vicinity of the facility, and thus, the user wants to avoid the battery exchange of the battery station 3 in the vicinity of the departure spot. In this case, in order to prompt the battery exchange in the battery station 3 in the vicinity of the destination of the user (a pass-through spot and an arrival spot), the promotion information is transmitted.

1b. In the battery station 3 in the vicinity of the destination of the user, power purchase (charging) is planned to be performed according to the request from the power market, or the facility in which the battery station is provided or the vicinity of the facility, and thus, the user wants to increase charging capacity of the battery station 3 in the vicinity of the destination, while avoiding the battery exchange in the battery station 3 in the vicinity of departure spot. In this case, in order to prompt the battery exchange in the battery station 3 in the vicinity of the destination of the user, the promotion information is transmitted.

1c. In the battery station 3 in the vicinity of the departure spot of the user, the power purchase (the charging) is planned to be quickly started according to the request from the power market, or the facility in which the battery station is provided or the vicinity of the facility. In this case, in order to prompt the battery exchange in the battery station 3 in the vicinity of the departure spot, the promotion information is transmitted.

1d. In the destination of the user, the charged battery 1 or the electric vehicle 2 in which the remaining amount of the battery is high, is insufficient. In this case, in order to prompt the battery exchange in the battery station 3 in the vicinity of the departure spot, the promotion information is transmitted.

1e. In a situation where a first user ends the use of the electric vehicle 2, and then, a second user who subsequently uses the electric vehicle 2, has to perform the battery exchange, the second user may feel inconvenience. However, in the vicinity of a pass-through spot or an arrival spot of the first user, the exchangeable battery 1 does not exist. In this case, in order to prompt the first user to perform the battery exchange in the battery station 3 in the vicinity of the departure spot, the promotion information is transmitted to the first user.

<2. Case of Transmitting Promotion Information During Travelling>

2a. In the battery station 3 of the pass-through spot of the user, the charged battery 1 is insufficient, or the electric power selling (the discharging) is planned to be performed according to the request from the power market, or the facility in which the battery station is provided or the vicinity of the facility, and thus, the user wants to avoid the battery exchange in the battery station 3 of the pass-through spot. In this case, in order to prompt the battery exchange in the battery station 3 in the vicinity of the next destination of the user (the pass-through spot and the arrival spot), the promotion information is transmitted.

2b. In the battery station 3 in the vicinity of the next destination of the user, the power purchase (the charging) is planned to be performed according to the request from the power market, or the facility in which the battery station is provided or the vicinity of the facility, and thus, the user wants to increase the charging capacity of the battery station 3 in the vicinity of the next destination, while avoiding the battery exchange in the battery station 3 of the pass-through spot. In this case, in order to prompt the battery exchange in the battery station 3 in the vicinity of the next destination of the user (the pass-through spot and the arrival spot), the promotion information is transmitted.

2c. In the battery station 3 of the pass-through spot of the user, the power purchase (the charging) is planned to be quickly started according to the request from the power market. In this case, in order to prompt the battery exchange in the battery station 3 of the pass-through spot, the promotion information is transmitted.

2d. In the next destination of the user, the charged battery 1 or the vehicle in which the remaining amount of the battery is high, is insufficient. In this case, in order to prompt the battery exchange in the battery station 3 in the pass-through spot, the promotion information is transmitted.

2e. In a situation where the first user ends the use of the electric vehicle 2, and then, the second user who subsequently uses the electric vehicle 2, has to perform the battery exchange, the second user may feel inconvenience. However, in the vicinity of the departure spot or the arrival spot first user, the exchangeable battery 1 does not exist. In this case, in order to prompt the first user to perform the battery exchange in the battery station 3 of the pass-through spot, the promotion information is transmitted to the first user.

<3. Case of Transmitting Promotion Information at Time of Usage End>

3a. In the battery station 3 in the vicinity of the arrival spot of the user, the power purchase (the charging) is planned to be quickly started according to the request from the power market, or the facility in which the battery station is provided or the vicinity of the facility. In this case, in order to prompt the battery exchange in the battery station 3 in the vicinity of the arrival spot, the promotion information is transmitted.

3b. In a situation where the first user ends the use of the electric vehicle 2, and then, the second user who subsequently uses the electric vehicle 2, has to perform the battery exchange, the second user may feel inconvenience. However, in the vicinity of the departure spot or the pass-through spot of the first user, the exchangeable battery 1 does not exist. In this case, in order to prompt the first user to perform the battery exchange in the battery station 3 in the vicinity of the arrival spot, the promotion information is transmitted to the first user.

Next, the charging and discharging necessity evaluation unit 40c of the management server 4 evaluates the necessity of charging and discharging each of the batteries 1, on the basis of a demand and a supply in the power market, or in the facility in which the battery station is provided or in the vicinity of the facility (STEP 3). Basically, the charging and discharging necessity evaluation unit 40c evaluates the necessity of charging and discharging each of the batteries 1 such that in a case where power surplus (Demand<Supply) occurs in the power market, or in the facility in which the battery station is provided or in the vicinity of the facility, the charging (the power purchase) is performed with respect to the battery 1 of the battery station 3, and in a case where power shortage (Demand>Supply) occurs in the power market, or in the facility in which the battery station is provided or in the vicinity of the facility, the discharging (the electric power selling) is performed from the battery 1 of the battery station 3 to the power network, or the facility in which the battery station is provided or the vicinity of the facility. In addition, the demand and the supply of the power may be expected on the basis of an external factor such as a time zone, the weather, and a temperature, and the necessity of charging and discharging each of the batteries 1, may be evaluated on the basis of the expected value, in addition to the actual demand and supply of the power.

The charging and discharging necessity evaluation unit 40c, for example, is capable of referring to the following information at the time of evaluating the necessity of charging and discharging the battery 1.

a. Actual or Expected Demand and Supply Request Timing b. Actual or Expected Electric Rate c. Actual or Expected $CO_2$ Emissions d. Actual or Expected Carbon Tax and Carbon Credit Here, the table of FIG. 8 illustrates the score of the exchangeability and the charging and discharging necessity of each of the batteries evaluated on the basis of STEP 1 to STEP 3 described above. As illustrated in FIG. 8, it is assumed that a plurality of batteries (batteries A to L) are stored in each of a plurality of battery stations (Example: stations 1 to 4). As an example, in STEP 1, the exchangeability of each of the batteries is evaluated in three stages of 0 to 2, in STEP 2, the exchangeability of each of the batteries is evaluated in six stages of 0 to 5, and in STEP 3, the charging necessity of the each of the batteries is evaluated in three stages of 0 to 2, and the discharging necessity is evaluated in six stages of 0 to −5. Then, a value obtained by summing up evaluation values of STEPS 1 to 3, is set to a charging priority (the minimum of 0 to the maximum of 9), and the charging speed of each of the batteries is determined according to the charging priority.

The evaluation described above is ended, and then, the charging and discharging control unit 40d of the management server 4 determines whether the station is a charging target or a discharging target, with respect to each of the battery stations 3 (STEP 4). In this embodiment, an example is assumed in which each of the battery stations 3 is not capable of simultaneously performing the charging and discharging with respect to the plurality of batteries 1 stored therein. That is, the battery station 3 is not capable of performing control such that the charging is performed or not or the discharging is performed or not, with respect to each of the batteries 1 stored therein, and is not capable of performing control such that the charging is performed with respect to a certain battery 1, and the discharging is performed with respect to the other battery 1. Here, the charging and discharging control unit 40*d* determines whether the station is the charging target or the discharging target, with respect to each of the battery stations 3, on the basis of the charging and discharging necessity evaluated in STEP 3. For example, in the table illustrated in FIG. 8, in the station 4, it is evaluated that the discharging necessity of the battery K and the battery L is high. For example, the discharging necessity of the battery K and the battery L is "−5", and an absolute value thereof is greater than an absolute value of the charging necessity of "2" of the battery J. Thus, for example, the maximum value (the absolute value) of the battery having charging necessity is compared with the maximum value (the absolute value) of the battery having discharging necessity, and in a case where the former is greater than the latter, the entire battery station 3 is designated to the discharging target. For this reason, in STEP 4, the station 4 is determined as the discharging target, and the other stations 1 to 3, are determined as the charging target.

Next, the charging and discharging control unit 40*d* determines whether or not the charging priority is higher than a constant threshold value, with respect to each of the batteries 1 stored in the battery station 3 determined as the discharging target (Step 5). Only the battery 1 of which the charging priority is higher than the constant threshold value, becomes the charging target. For example, in the examples as illustrated in FIG. 7 and FIG. 8, only the battery of which the charging priority is "2" or more, is recognized as the charging target. Specifically, only the batteries A, B, D, F, H, and I of which the charging priority is "2" or more, are set to the charging target, and the batteries C and E of which the charging priority is "1" or less, are excluded from the charging target. Furthermore, the charging is not performed with respect to the batteries C and E.

Next, the charging and discharging control unit 40*d* controls the charging speed of each of the batteries 1 selected as the charging target, on the basis of the charging priority obtained from the evaluation values of STEP 1 to STEP 3 (Step 6). For example, in the batteries A, B, D, F, H, and I which are the charging target, the charging priority of the battery G is the highest as "6", and the charging priority of the battery F is the lowest as "2". For this reason, the charging and discharging control unit 40*d* generates the charging control information with respect to each of the battery stations 3, such that the battery G is charged most quickly, and the battery F is charged most slowly, in the batteries which are the charging target. Furthermore, the charging control information with respect to each of the battery stations 3 is generated such that each of the batteries 1 recognized as the charging target, is charged at the charging speed according to the charging priority. The management server 4 transmits the charging control information generated by the charging and discharging control unit 40*d*, to each of the battery stations 3 which become the charging target. The battery station 3 performs the charging while adjusting the charging speed of each of the batteries 1 stored therein, according to the charging control information accepted from the management server 4.

On the other hand, in STEP 4, the charging and discharging control unit 40*d* determines whether or not each of the batteries 1 stored in the battery station 3, is the discharging target, with respect to the battery station 3 (the station 4) excluded from the charging target (Step 7). For example, in the examples illustrated in FIG. 7 and FIG. 8, in the batteries J, K, and L in the station 4, the battery J is not required to be discharged, and thus, is excluded from the discharging target, and the batteries K and L are required to be discharged, and thus, are determined as the discharging target. Furthermore, the charging or the discharging is not performed with respect to the battery J.

Next, the charging and discharging control unit 40*d* controls the discharging speed of the battery 1 recognized as the discharging target, on the basis of the discharging necessity evaluated in STEP 3 (Step 8). For example, the discharging necessity of the batteries K and L are evaluated as "5", and thus, the charging and discharging control unit 40*d* performs the discharging (the electric power selling) from the batteries K and L to the power network, or the facility in which the battery station is provided, or the vicinity of the facility, according to the evaluation result. The charging and discharging control unit 40*d* generates discharging control information with respect to the battery required to be discharged, and transmits the discharging control information to the battery station 3 which is the discharging target. The battery station 3 performs discharging to the power network, the facility in which the battery station is provided or the vicinity of the facility, while adjusting the charging speed of each of the batteries 1 stored therein, according to the discharging control information accepted from the management server 4.

Subsequently, the details of STEP 1 illustrated in FIG. 7, will be described with reference to FIG. 9 and FIG. 10. In STEP 1, in a case where the exchangeability of each of the batteries 1 is evaluated according to the usage situation of the electric vehicle 2, the management server 4 determines or expects which user starts to use which electric vehicle 2 at what time (STEP 1-1). For example, the management server 4 is capable of specifying the user who uses the service, the electric vehicle 2 according to the use of the user, and a usage start timing of the electric vehicle 2, on the basis of the vehicle usage request or the vehicle usage reservation received from the user terminal 5. In addition, the management server 4 may expect the future usage situation of the user on the basis of the usage history of a specific user, or is capable of expecting the future usage situation of all of the users, on the basis of the usage history of an unspecified number of general users.

Next, the management server 4 expects a movement range of the user who gets in the electric vehicle 2, on the basis of the specification or the expectation in STEP 1-1, and determines the battery station 3 in the movement range (STEP 1-2). For example, the management server 4 expects a movable distance around the departure spot, from the departure spot (the usage start place) of the electric vehicle 2, the battery remaining amount of the battery 1 mounted on the electric vehicle 2, and sets a circle of which the radius is the movable distance, to the movement range of the user. In addition, the management server 4 may periodically acquire the position information from the electric vehicle 2, may obtain the past movement path of the electric vehicle 2, on the basis of the position information, and may expect the future movement direction from the movement path. The future movement direction of the user is expected, and thus, it is possible to increase an accuracy of expecting the movement range of the user who gets in the electric vehicle 2. In addition, the management server 4 may expect the movement range of the user, on the basis of the usage history of a specific user, or is capable of expecting the movement range of all of the users, on the basis of the usage history of an unspecified number of general users.

Next, the management server 4 evaluates the exchange necessity of the battery 1 mounted on the electric vehicle 2 which is used by the user (STEP 1-3). In particular, here, the exchange necessity of the battery 1 is evaluated at the usage start time point (the departure time point) of the electric vehicle 2 of the user. For example, in a case where the battery remaining amount of the battery 1 of the electric vehicle 2 is low, the electric vehicle 2 is evaluated as having high exchange necessity of the battery, in a case where the battery remaining amount is high, the electric vehicle 2 is evaluated as having low exchange necessity of the battery. In addition, the management server 4 may expect a battery consumed amount according to the movement, from the movement range of the electric vehicle 2 expected in STEP 1-2, and may expect the exchange necessity of the battery, on the basis of the consumed amount. In addition, the management server 4 may expect the exchange necessity of the battery 1 mounted on the electric vehicle 2, on the basis of the usage history of the specific user, or is capable of expecting the exchange necessity of the batteries of all of the electric vehicles 2, on the basis of the usage history of an unspecified number of general users.

Next, the management server 4 evaluates the exchangeability with respect to each of the batteries 1 in each of the battery stations, on the basis of the determination, the expectation, and the evaluation result from STEP 1-1 to STEP 1-3 (STEP 1-4). With reference to the example of FIG. 10, in STEP 1-2, the management server 4 expects the movement range of the electric vehicle, from the position of the usage start time point, and the expected movement direction of the electric vehicle, with respect to each of the electric vehicles. In addition, in STEP 1-3, the management server 4 evaluates the exchange necessity of the battery, from the remaining amount of the battery mounted on each of the electric vehicles. On the premise of such circumstances, in STEP 1-4, the management server 4 evaluates the exchangeability of the battery in each of the battery stations. In particular, it is preferable that the exchangeability of each of the batteries is evaluated on the basis of the information of the usage start time point of the electric vehicle of the user.

Specifically, in the example illustrated in FIG. 10, the exchangeability of each of the battery stations is evaluated in three stages of 0 to 2. For example, the station 1 is in the expected movement range of a vehicle A and a vehicle B, and is positioned in the expected movement destination of the vehicle A and the vehicle B. For this reason, the battery in the station 1 is evaluated as having high exchangeability, and the exchangeability is evaluated as "2". In addition, all of the stations 2, 4, and 5 are in the expected movement range of the vehicle A or the vehicle B. For this reason, in the stations 2, 4, and 5, the exchangeability is approximately constant, and thus, the exchangeability is evaluated as "1". In addition, a vehicle C is positioned in the vicinity of a station 6, but the user does not yet get in the vehicle C. Here, the vehicle C is reserved in advance such that a certain user will get therein, and is expected such that the use of the vehicle C will be started within a certain time. Further, the remaining amount of the battery mounted on the vehicle C is low as 10%. For this reason, the battery in the station 6 is evaluated as having high exchangeability, and the exchangeability is evaluated as "2". On the other hand, the station 3 is positioned in the expected movement range of the vehicle A, but is close to the current position of the vehicle A, and has a sufficient remaining amount since the battery remaining amount of the vehicle A is 90%. For this reason, in the station 3, the battery is evaluated as having low exchangeability, and the exchangeability is evaluated as "0". In addition, the stations 7, 8, and 9 are not in the expected movement range of any vehicle, and do not exist in the movement destination of the vehicle, and thus, the battery is evaluated as having low exchangeability, and the exchangeability is evaluated as "0". Thus, the exchangeability of each of the batteries in the battery station is evaluated according to the situation of the usage start time point of the electric vehicle. Furthermore, in FIG. 10, an evaluation example of the exchangeability of the battery is simply illustrated, but in practice, the exchangeability of the battery is evaluated in consideration of a more complicated condition.

As illustrated in FIG. 4, the control unit 40 of the management server 4 includes the battery usage management unit 40*e*. The battery usage management unit 40*e*, basically determines and manages a usage application of the battery, according to the degree of deterioration of each of the batteries. As described above, in this embodiment, the usage of the battery is set for a large-size electric vehicle (the degree A of deterioration), for a small-size electric vehicle (the degree B of deterioration), for a portable power source (the degree C. of deterioration), and for a stationary storage battery (the degree D of deterioration), according to the degree of deterioration of each of the batteries. The battery usage management unit 40*e* determines the category of the electric vehicle or the other electric equipments, which are can be used, on the basis of such a usage of the battery. For example, the battery for the large-size electric vehicle (the degree A of deterioration) is a battery dedicated to an electric automobile category, and is not capable of being used as a power source of a small-size electric vehicle, a portable power source, or a stationary storage battery. For this reason, the battery usage management unit 40*e* may control the locking device of the battery station in which the battery is stored, such that the battery for the large-size electric vehicle (the degree A of deterioration) is not capable of being used by a user other than the user of the electric automobile. Alternatively, even in a case where the control signal is directly transmitted to the battery itself, and the battery for the large-size electric vehicle (the degree A of deterioration) is mounted on the electric vehicle other than the electric automobile, the battery usage management unit 40*e* may control the battery not to supply the power to the vehicle. In addition, in a case where the control signal is directly transmitted to the electric vehicle, and the battery for the large-size electric vehicle (the degree A of deterioration) is mounted on the electric vehicle other than the electric automobile, the battery usage management unit 40*e* may control the electric vehicle to accept the power from the battery. In addition, for example, in a case where the number of batteries of the degree B of deterioration is relatively less than the number of batteries of the degree A of deterioration, on the basis of the user demand, the number of times of the charging and discharging is increased or the speed of the charging and discharging is increased, by allowing the user to intensively use the battery of the degree A of deterioration, and thus, it is possible to intentionally accelerate the deterioration of the battery of the degree A of deterioration. Alternatively, in a case where it is necessary to perform the charging and discharging with respect to the battery of the degree B of deterioration, in order to intentionally decelerate the deterioration of the battery, the charging speed and the discharging speed of the battery of the degree B of deterioration may decrease. Thus, the battery usage management unit 40*e* determines the usage application of the battery, according to the degree of deterioration of each of the batteries, and is capable of control the battery station, the electric vehicle, or the battery itself such that the battery is used in the usage.

Furthermore, in the embodiment described above, the exchangeability of each of the batteries is evaluated according to the usage situation of the electric vehicle, and the charging speed or the discharging speed of the battery stored in the battery station is determined. Here, there is a case where the charging of the battery is not completed until the electric vehicle arrives at the battery station, according to the position of the electric vehicle or the charging situation of the battery in the battery station. In such a case, the battery of which the charging is not obviously completed in time, may be excluded from the charging target, or the exchangeability of the battery may be excluded from the evaluation target.

As described above, herein, the embodiment of the present invention has been described with reference to the drawings, in order to express the contents of the present invention. Here, the present invention is not limited to the embodiment described above, and includes modifications and improvements obvious to a person skilled in the art, on the basis of the matters described herein.

INDUSTRIAL APPLICABILITY

The present invention relates to a battery for an electric vehicle management system and the like. In particular, the system of the present invention can be used in the sharing service of the electric vehicle.

REFERENCE SIGNS LIST

1 BATTERY
2 ELECTRIC VEHICLE
3 BATTERY STATION
4 MANAGEMENT SERVER
5 USER TERMINAL
10 BATTERY MANAGEMENT SYSTEM
11 COMMUNICATION DEVICE
12 GPS
13 BATTERY CELL
20 VEHICLE CONTROL UNIT
21 ELECTRONIC CONTROL DEVICE
22 COMMUNICATION DEVICE
23 GPS
24 MOTOR
25 POWER CONTROL DEVICE
26 SPEED METER
27 REMAINING AMOUNT METER
28 LOCKING DEVICE
30 CONTROL DEVICE
32 DETECTOR
33 COMMUNICATION DEVICE
34 POWER SOURCE
34a NATURAL ENERGY GENERATOR
34b POWER NETWORK
35 LOCKING DEVICE
40 CONTROL UNIT
40a EXCHANGEABILITY EVALUATION UNIT
40b PROMOTION TRANSMISSION UNIT
40c CHARGING AND DISCHARGING NECESSITY EVALUATION UNIT
40d CHARGING AND DISCHARGING CONTROL UNIT
40e BATTERY USAGE MANAGEMENT UNIT
41 COMMUNICATION UNIT
42 BATTERY DATABASE
43 ELECTRIC VEHICLE DATABASE
44 STATION DATABASE
45 USER DATABASE
50 TERMINAL CONTROL DEVICE
51 STORAGE DEVICE
52 COMMUNICATION DEVICE
53 GPS
54 DISPLAY DEVICE
55 MANIPULATION DEVICE
100 BATTERY MANAGEMENT SYSTEM

The invention claimed is:

1. A battery management system, comprising:
a plurality of electric vehicles capable of travelling by driving a motor with an exchangeable battery;
a battery station capable of charging the battery by adjusting a charging speed; and
a management server connected to the plurality of electric vehicles and the battery station through a communication network,
wherein the management server quantitatively evaluates exchangeability of the battery stored in the battery station, on the basis of at least a distribution density of the plurality of electric vehicles and battery remaining amounts of the battery mounted on the plurality of electric vehicles, the distribution density of the plurality of electric vehicles and the battery remaining amounts being periodically transmitted from the plurality of electric vehicles,
the management server determines the charging speed of the battery of the battery station by the exchangeability of the battery which is evaluated on the basis of at least the distribution density of the plurality of electric vehicles and the battery remaining amounts of the battery which are periodically transmitted from the plurality of electric vehicles, and
the management server transmits control information relevant to the determined charging speed, to the battery station.

2. The battery management system according to claim 1, wherein the plurality of electric vehicles is shared by a plurality of users, and
the management server further quantitatively evaluates the exchangeability of the battery stored in the battery station, on the basis of a usage start position of the plurality of electric vehicles of the user and a travelling direction of the user, the travelling direction of the user including: the travelling direction of the user who gets in one of the plurality of electric vehicles; and the travelling direction of the user who does not get in one of the plurality of electric vehicles.

3. The battery management system according to claim 2, further comprising:
user terminals possessed by the plurality of users, wherein the management server
is capable of transmitting promotion information including a privilege to be applied to the user for leading the user to the battery station, to the user terminals, and
further quantitatively evaluates the exchangeability of the battery stored in the battery station, on the basis of the promotion information.

4. The battery management system according to claim 1 or 2,
wherein the battery station is further capable of discharging the battery by adjusting a discharging speed, and the management server quantitatively evaluates necessity of charging or discharging the battery stored in the battery station, on the basis of a demand and a supply of power in a power market, or in a facility in which the battery station is provided or in the vicinity of the facility, determines the charging speed or the discharging speed of the battery of the battery station, on the basis of the evaluation value of the exchangeability of the battery and an evaluation value of the necessity of charging or discharging the battery, and transmits control information relevant to the determined charging speed or discharging speed, to the battery station.

5. The battery management system according to claim 3, wherein the battery station is further capable of discharging the battery by adjusting a discharging speed, and
the management server quantitatively evaluates necessity of charging or discharging the battery stored in the battery station, on the basis of a demand and a supply of power in a power market, or in a facility in which the battery station is provided or in the vicinity of the facility, determines the charging speed or the discharging speed of the battery of the battery station, on the basis of the evaluation value of the exchangeability of the battery and an evaluation value of the necessity of charging or discharging the battery, and transmits control information relevant to the determined charging speed or discharging speed, to the battery station.

6. The battery management system according to claim 1 or 2,
wherein the plurality of electric vehicles include a plurality of categories of electric vehicles having different usages, and
the management server determines the category of the plurality of electric vehicles on which the battery is mounted, according to a degree of deterioration of the battery.

7. The battery management system according to claim 4,
wherein the plurality of electric vehicles include a plurality of categories of electric vehicles having different usages, and
the management server determines the category of the plurality of electric vehicles on which the battery is mounted, according to a degree of deterioration of the battery.

8. The battery management system according to claim 5,
wherein the plurality of electric vehicles include a plurality of categories of electric vehicles having different usages, and
the management server determines the category of the plurality of electric vehicles on which the battery is mounted, according to a degree of deterioration of the battery.

9. The battery management system according to claim 1 or 2,
wherein the battery is capable of being used in equipment other than the plurality of electric vehicles,
the equipment includes a plurality of categories of equipment having different usages, and
the management server determines the category of the equipment of using the battery, according to the degree of deterioration of the battery.

10. The battery management system according to claim 4,
wherein the battery is capable of being used in equipment other than the plurality of electric vehicles,
the equipment includes a plurality of categories of equipment having different usages, and
the management server determines the category of the equipment of using the battery, according to the degree of deterioration of the battery.

11. The battery management system according to claim 5,
wherein the battery is capable of being used in equipment other than the plurality of electric vehicles,
the equipment includes a plurality of categories of equipment having different usages, and
the management server determines the category of the equipment of using the battery, according to the degree of deterioration of the battery.

12. A management server connected to a plurality of electric vehicles capable of travelling by driving a motor with an exchangeable battery, and a battery station capable of charging the battery by adjusting a charging speed, through a communication network,
wherein the management server quantitatively evaluates exchangeability of the battery stored in the battery station, on the basis of at least a distribution density of the plurality of electric vehicles and battery remaining amounts of the battery mounted on the plurality of electric vehicles, the distribution density of the plurality of electric vehicles and the battery remaining amounts being periodically transmitted from the plurality of electric vehicles,
the management server determines the charging speed of the battery of the battery station by the exchangeability of the battery which is evaluated on the basis of at least the distribution density of the plurality of electric vehicles and the battery remaining amounts of the battery which are periodically transmitted from the plurality of electric vehicles, and
the management server transmits control information relevant to the determined charging speed, to the battery station.

13. A computer readable medium storing a computer program for allowing a server device to function as the management server according to claim 12.

14. A battery management method, comprising:
a step of quantitatively evaluating exchangeability of an exchangeable battery stored in a battery station, on the basis of at least a distribution density of a plurality of electric vehicles capable of travelling by driving a motor with the battery, and battery remaining amounts of the battery mounted on the plurality of electric vehicles, the distribution density of the plurality of electric vehicles and the battery remaining amounts being periodically transmitted from the plurality of electric vehicles;
a step of determining a charging speed of the battery of the battery station by the exchangeability of the battery which is evaluated on the basis of at least the distribution density of the plurality of electric vehicles and the battery remaining amounts of the battery which are periodically transmitted from the plurality of electric vehicles; and
a step of charging the battery by the battery station, on the basis of the determined charging speed.

15. The battery management system according to claim 1,
wherein the management server quantitatively evaluates the exchangeability of the battery stored in the battery station, on the basis of a traveling direction of the plurality of electric vehicles in addition to the distribution density of the plurality of electric vehicles and the battery remaining amounts of the battery mounted on the plurality of electric vehicles, the traveling direction of the plurality of electric vehicles being periodically transmitted from the plurality of electric vehicles, and the management server determines the charging speed of the battery of the battery station by the exchangeability of the battery which is evaluated on the basis of the traveling direction of the plurality of electric vehicles which is periodically transmitted from the plurality of electric vehicles in addition to the distribution density of the plurality of electric vehicles and the battery remaining amounts of the battery.

* * * * *